(12) United States Patent
Asao et al.

US006377030B1

(10) Patent No.: US 6,377,030 B1
(45) Date of Patent: Apr. 23, 2002

(54) METHOD OF CHARGING SECONDARY BATTERY BY VARYING CURRENT OR VOLTAGE AT AN INFLECTION POINT IN A STORAGE REGION BEFORE FULL CHARGE AND DEVICE THEREFOR

(75) Inventors: Masaya Asao, Kyotanabe; Soichiro Kawakami, Nara, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,889

(22) Filed: Jul. 29, 1999

(30) Foreign Application Priority Data

Jul. 31, 1998 (JP) ............................................ 10-229549
Jul. 8, 1999 (JP) ............................................ 11-194288

(51) Int. Cl.⁷ ............................................ H01M 10/44
(52) U.S. Cl. ...................................................... 320/161
(58) Field of Search ............................... 320/127, 128, 320/135, 148, 156, 157, 160, 161, 162, 164

(56) References Cited

U.S. PATENT DOCUMENTS

| 4,385,269 A | | 5/1983 | Aspinwall et al. | |
|---|---|---|---|---|
| 4,388,582 A | * | 6/1983 | Saar et al. | |
| 4,503,378 A | * | 3/1985 | Jones et al. | |
| 5,057,762 A | * | 10/1991 | Goedken et al. | |
| 5,268,630 A | * | 12/1993 | Bhagwat et al. | |
| 5,494,762 A | | 2/1996 | Isoyama et al. | ............ 429/194 |
| 5,600,226 A | * | 2/1997 | Falcon | |
| 5,640,080 A | | 6/1997 | Tamai et al. | .................. 320/21 |
| 5,780,994 A | * | 7/1998 | Sisemore | |

FOREIGN PATENT DOCUMENTS

| DE | 44 20 249 | 12/1995 |
|---|---|---|
| DE | 196 28 022 | 1/1998 |
| EP | 0 378 043 | 7/1990 |
| JP | 5-114422 | 5/1993 |
| JP | 5-152002 | 6/1993 |
| JP | 6-36803 | 2/1994 |
| JP | 6-290814 | 10/1994 |
| JP | 7-263031 | 10/1995 |
| JP | 8-45550 | 2/1996 |
| JP | 8-241735 | 9/1996 |
| JP | 9-117075 | 5/1997 |

* cited by examiner

*Primary Examiner*—Edward H. Tso
(74) *Attorney, Agent, or Firm*—Fitzpatrick, Cella, Harper & Scinto

(57) ABSTRACT

Provided is a charging method of a secondary battery capable of reducing the irreversible quantity in initial charge and discharge cycles after production of the battery and improving charge and discharge cycle characteristics. The secondary battery is at least comprised of an anode, a cathode, and an electrolyte and has a curve of anode potential or cathode potential against storage quantity, or an open-circuit voltage curve against storage quantity with inflection points. A charging operation of the secondary battery is carried out in a predetermined wave form at least until the inflection point. After passing the inflection point, until a fully charged state is achieved, the charging is performed in a different pattern from that before the inflection point.

28 Claims, 15 Drawing Sheets

(EMBODIMENT 1)

(EMBODIMENT 2)

(COMPARATIVE EXAMPLE 1)

(EMBODIMENT 5)

(EMBODIMENT 6)

(EMBODIMENT 7)

(COMPARATIVE EXAMPLE 2)

METHOD OF CHARGING SECONDARY BATTERY BY VARYING CURRENT OR VOLTAGE AT AN INFLECTION POINT IN A STORAGE REGION BEFORE FULL CHARGE AND DEVICE THEREFOR

BACKGROUND OF THE INVENTION

1. Field of the Invention

The present invention relates to a charging method for a secondary battery and a device therefor and, more particularly, to a charging method during initial charge-discharge cycles after production of the secondary battery and a device therefor. Further, the present invention relates to a charging method for a secondary battery and a device therefor in cases where the secondary battery utilizes an oxidation-reduction reaction of lithium ions.

2. Related Background Art

In recent years, it has been determined that an increase in $CO_2$ in the atmosphere causes the so-called greenhouse effect which, in turn, leads to global warming. Further, it should be noted that it is not easy to construct new thermal power plants. It is thus believed that so-called load leveling should be employed to store night-generated power in secondary batteries installed in ordinary homes in order to utilize power generators more effectively. Demands are increasing more and more for the development of high energy density secondary batteries for electric vehicles free of emission of air pollutants and for the high-performance secondary batteries as power supplies for portable equipment such as notebook type personal computers, word processors, video cameras, cellular phones, and so on.

Lithium (Li) secondary batteries making use of the electrochemical oxidation-reduction reaction of lithium have a higher operating voltage and lower weight than nickel-cadmium secondary batteries and lead second batteries which have been used heretofore. Thus, these Li batteries are drawing attention as high energy density type secondary batteries.

High-capacity Li secondary batteries using metallic lithium for the anode have an extremely short cycle life in charge and discharge cycles and are not yet put to practical use. It is generally believed that the principal cause of the short cycle life of charge and discharge is that the metallic lithium reacts with impurities of water, etc. and an organic solvent in an electrolyte solution to form an insulating film. This causes the lithium to grow into dendrites (dendrite crystals) with repetition of charge and discharge, and they establish an internal short circuit between the anode and the cathode, so as to cut short cycle life.

On the other hand, development is proceeding in so-called "lithium ion batteries" of the rocking chair type using as a cathode substance a lithium intercalation compound which deintercalates lithium ions from between layers in the oxidation-reduction reaction during charge and using as an anode substance a carbon material typified by graphite which can intercalate lithium ions between layers of six membered ring network planes comprised of carbon atoms. In this "Li ion battery," however, the anode made of the carbon material of the graphite structure can theoretically intercalate at most only one sixth a lithium atom per carbon atom, and it is thus unsuccessful in realizing a high energy density secondary battery comparable to the Li primary batteries using the metallic lithium as an anode substance.

There are also proposals on methods of making an anode of a material selected from a lithium alloy, or a metal forming an alloy with lithium during charge, for example, aluminum, cadmium, indium, tin, antimony, lead, bismuth, or the like, alloys of these metals, or substances absorbing and desorbing lithium during charge and discharge. Examples of the substances absorbing and desorbing lithium during charge and discharge are silicon, metal oxides, and metal nitrides.

The Li secondary batteries using the metallic lithium, the carbon materials, the lithium alloys, the metals forming the alloy with lithium during charge, and the substances absorbing and desorbing lithium during charge and discharge are problematic in that the charge-discharge Coulomb efficiency does not reach 100% by initial charge and discharge after production of a battery. The reason is that there is an irreversible amount of lithium, because part of the lithium charged in the anode does not return to the cathode in the initial charge and discharge cycles after production of the battery.

This irreversible amount of lithium reduces the battery capacity of the Li secondary battery and is one of the causes of a shortened charge and discharge cycle life. There are thus desires for an activation method which restrains this irreversible amount.

The charging methods suggested heretofore include the following methods. A first suggestion is to specify the materials for the Li secondary battery and the charging method in order to suppress deposition of dendrites of the lithium metal. Specifically, Japanese Laid-open Patent Applications No. 5-114422 and No. 5-152002 disclose a method for making a battery using metallic lithium as an anode-active material, manganese dioxide as a cathode-active material, and a solution of lithium perchlorate dissolved in propylene carbonate as an electrolyte solution and for pulse-charging this battery; Japanese Laid-open Patent Application No. 7-263031 discloses a method for using metallic lithium as an anode-active material, the carbon-active material, and ethylene carbonate as a non-aqueous solvent of a non-aqueous electrolyte solution, and for pulse-charging the battery; Japanese Laid-open Patent Application No. 6-36803 discloses a method for carrying out pulse charging to repeat energization and stopping for the Li secondary battery using metallic lithium as an anode-active material. The above charging methods, however, have not increased cycle life in the practical area of lithium metal high energy density secondary batteries taking advantage of the intrinsic characteristics of the lithium metal, i.e., light weight and high capacity. None of the applications discloses anything about suppression of the irreversible amount of lithium in the initial charge and discharge.

Moreover, Japanese Laid-open Patent Application No. 9-117075, Japanese Laid-open Patent Application No. 6-290814 (U.S. Pat. No. 5,494,762), Japanese Laid-open Patent Application No. 8-45550 (U.S. Pat. No. 5,640,080), and Japanese Laid-open Patent Application No. 8-241735 (U.S. Pat. No. 5,640,080) disclose pulse charging methods as charging methods for shortening the charge time of lithium ion secondary batteries using carbon material for the anode. They all, however, fail to disclose a method for suppressing the above-described irreversible amount of lithium.

SUMMARY OF THE INVENTION

An object of the present invention is to provide an activation or charging method for a battery and a device therefor, solving the above problems, particularly, suppressing the non-dischargeable amount (the irreversible amount)

in the initial stage of charge and discharge cycles after production of a battery, and improving the charge-discharge cycle characteristics in the secondary battery.

For accomplishing the above object, the present invention provides a charging method for a secondary battery at least comprised of an anode, a cathode, and an electrolyte and having an inflection point in a storage region before full charge (storage quantity 100%) in an anode potential curve or a cathode potential curve against storage quantity or in a curve of open-circuit voltage against storage quantity, wherein in carrying out a charging operation of the secondary battery by a charging current or a charging voltage of a predetermined waveform, the secondary battery is charged with variation of the charging current and/or the charging voltage, at least prior to arrival at the inflection point. Further, the charging method of the present invention is a method for charging the secondary battery by changing a charging pattern before to one after the storage quantity at the inflection point, i.e., by changing the waveform of the charging current or the waveform of the charging voltage before to one after the storage quantity at the inflection point.

The present invention also provides a charging device for a secondary battery for charging the secondary battery, said device comprising: a) a connection portion at least capable of electrically being connected to input and output terminals of a cathode and an anode of the secondary battery; b) charging means for charging the secondary battery via the connection portion; c) variation means for effecting variation of a charging current and/or a charging voltage of the charging means; and d) means for switching a charge pattern of the charging means before a predetermined charge quantity to another charge pattern after said charge quantity. The present invention further provides an activation device for a secondary battery for activating the secondary battery after assembly by charging and discharging the secondary battery, while providing the above charging device with e) means for discharging the secondary battery and f) means for switching electrical connection or disconnection between the secondary battery and the charging means or the discharging means.

Further, the present invention provides a charging device or a device for activating a battery of a cell pack structure wherein one or more secondary batteries connected in parallel or in series and held within a package, and a unit for communicating with the battery pack is provided.

DETAILED DESCRIPTION OF THE PREFERRED EMBODIMENTS

Figure 1:
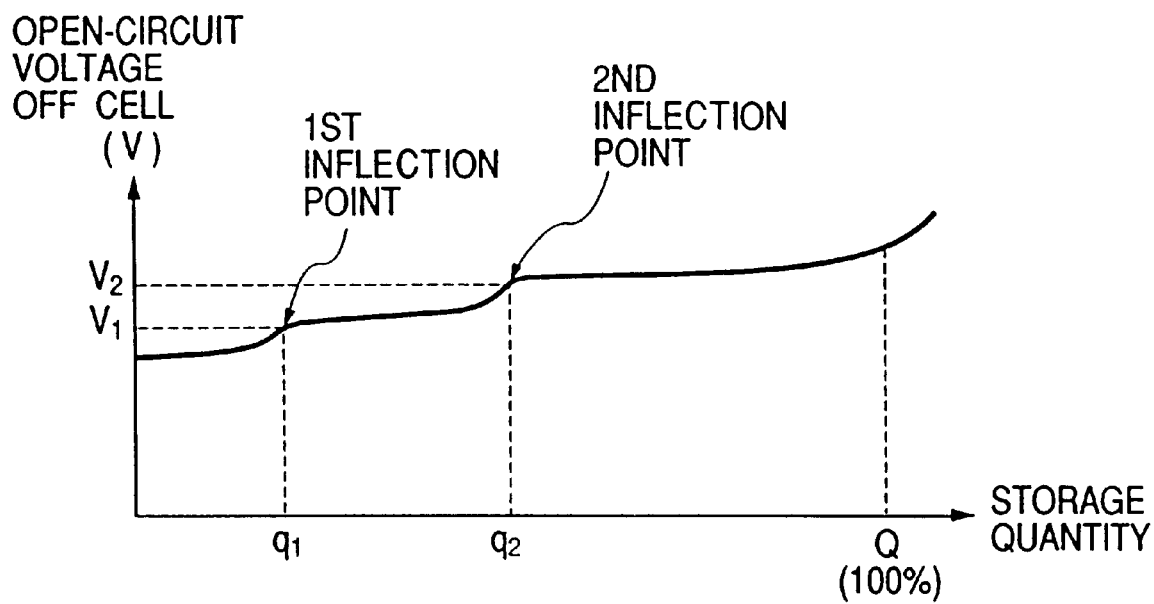
FIG. 1 is a diagram to show a cell open-circuit voltage curve with inflection points against storage quantity of the Li secondary battery.

In the present invention, the aforementioned "variation of the charging current and/or the charging voltage" is preferably such a control that the charging current and/or the charging voltage varies in accordance with a signal wave. Further, it is preferable to switch a charge pattern to another, using different aforementioned reference signals, i.e., to effect the variation of the charging current and/or the charging voltage, before and after the storage quantity (charge amount) at the aforementioned inflection point. It is also preferable to charge the battery at a constant current or at a constant voltage after passing over the storage quantity at the aforementioned inflection point.

The waveform of this reference signal is preferably one selected from a rectangular wave, a step (stepwise) wave, a sawtooth wave, a sine wave, or a combination of two or more of these.

Before arrival at the storage quantity at the inflection point, with the variation of the charging current and/or the charging voltage, the variation also preferably includes variation in the discharging direction to discharge part of the storage quantity.

A preferable secondary battery to which the charging method of the present invention is applied is one in which the storage quantity at the inflection point is 60% or less of the battery capacity. A more preferable secondary battery is one in which the storage quantity at the inflection point is 40% or less of the battery capacity.

The above-described changing waveform desirably changes the above signal waveform after passing the inflection point.

The secondary battery preferably has two or more inflection points. The battery is preferably charged up to the full charge state by carrying out at least one or more discharge operations before arrival at the storage quantity at the aforementioned inflection point.

Before arrival at the storage quantity at the inflection point, at least the waveform of the charging current preferably includes repetition of unit waveforms including a waveform component to allow flow of the discharging current. The waveform of the charging current preferably includes a quiescent or rest component during a period of transfer from a charge process part to a discharge process part and/or during a period of transfer from a discharge process part to a charge process part. The discharge quantity of the secondary battery by the above discharge process part is preferably 1 to 99% of the charge quantity by the above charge process part.

The change of the charging current is preferably change in an increasing direction. The change of the charging current in the A increasing direction is preferably a stepwise increase. A quiescent operation is preferably provided during the stepwise increase of the charging current.

The change of the charging voltage is preferably a change in an increasing direction. The change of the charging voltage in the increasing direction is preferably a stepwise increase. A quiescent operation is preferably provided during the stepwise increase of the charging voltage.

The inflection point is preferably a point at which a structural change occurs in the active material forming the anode or the cathode.

The secondary battery is preferably a secondary battery making use of the oxidation-reduction reaction of lithium ions.

The anode preferably has the electrode structure composed of at least a current collector and a principal material on one side or both sides of the collector, the principal material being one selected from metals, lithium alloys, metal oxides, metal nitrides, carbon materials, silicon, or composites thereof capable of absorbing and desorbing lithium ions.

The principal material forming the anode is preferably an electrode structure made of tin or a tin alloy.

The above charging method and device are applied to the initial charging after assembly of the secondary battery (charge and discharge cycles not more than 10 cycles and preferably not more than 5 cycles) and particularly preferably to that immediately after assembly of the secondary battery.

The inventors have conducted intensive and extensive research in order to solve the problems occurring in secondary batteries making use of the oxidation-reduction reaction of Li described previously. The inventors have found that in the charging method or the charging device after cell assembly of the secondary battery comprised at least of the anode, the cathode, and the electrolyte and having the inflection point in the anode potential or cathode potential curve, or in the cell open-circuit voltage curve against storage quantity, when the battery is charged by changing the charging current or the charging voltage in the increasing and/or decreasing direction in the storage region before arrival at the storage quantity at the inflection point and at least up to the storage quantity at the inflection point before the full charge (storage quantity 100%), the irreversible capacity (undischargeable charge quantity) in the initial charge and discharge cycles can be reduced, and the charge and discharge cycle characteristics can be improved.

It is particularly preferable to make the charging current or the charging voltage vary in response to the reference signal at the inflection point, and this is particularly effective in the secondary battery having at least one or more inflection points.

Inflection Point

The inflection point in the characteristics of the secondary battery in the present invention is defined as follows. Where the potential of the anode or the potential of the cathode, or the open-circuit voltage of the secondary battery at the storage quantity q of the secondary battery is expressed by a function $V(q)$ and where the function $V(q)$ changes its concave or convex state from convex (or concave) to concave (or convex) at the border of $q=a$ or where the slope of the curve $V(q)$ is constant at the border, the point a is defined as an inflection point of the function $V(q)$.

The inflection point can be obtained in the potential curve of the anode or the potential curve of the cathode, or in the open-circuit voltage curve of the battery against the storage quantity of the battery and can be approximately obtained in a cell voltage curve against charge quantity or discharge quantity as well.

The relationship between the above inflection point and the electrochemical reaction in the present invention is presumably such that different electrochemical reactions take place before and after the inflection point.

The different electrochemical reactions are, for example, electrochemical change or molecular structural change of the electrode-active materials, reaction between the electrodes and the electrolyte (electrolyte solution), reaction of the electrolyte (electrolyte solution), and so on. In the Li secondary batteries making use of the oxidation-reduction reaction of Li, specifically in the case of charging, they are, for example, intercalation of lithium ions into the anode-active material, desorption from the cathode-active material, reaction between the anode and Li, decomposition of the solvent in the electrolyte solution, or polymerization or the like around the inflection point. When there are several phases of change in the structure of the active material because of the intercalation of lithium ions into the above active material or deintercalation from the active material, there also appear a plurality of inflection points.

In the method of the present invention, the inflection point described above is obtained for the open-circuit voltage curve of the secondary battery by preparing a test sample in the same design as the secondary battery and carrying out a charge and discharge test using the test sample.

As for the potential curve of the anode or the potential curve of the cathode, the potential curve and the inflection point described above are obtained in a test cell provided with a reference electrode as a counter electrode against the anode or the cathode of the secondary battery, and actual charge operations are carried out using these.

In the present invention, the "active material" represents the general name of substances involved in the electrochemical reaction of charge and discharge in the battery and also embraces other substances involved in the above reaction as long as they themselves are substances involved in the above reaction. Namely, in the Li secondary batteries, Li as an anode-active material is retained on the anode side during charge and is dissolved into the electrolyte solution during discharge to become lithium ions. The active material also includes a substance acting as a guest during the charge and discharge to help transfer electrons in the oxidation or reduction reaction.

Storage Quantity

The storage quantity is the quantity of electricity that can be extracted from the battery by discharge and varies depending upon a charge state of the battery.

The storage quantity 100% is the maximum of discharge quantity extracted repeatedly.

Since the anode and the cathode have their specific potentials, depending upon the charge state of the anode and the cathode, the storage quantity can be calculated from the potentials of the battery materials used or the open-circuit voltage of the battery. Accordingly, the storage quantity can be calculated by preliminarily investigating the relationship between the storage quantity and the potentials of the materials of the battery used (the anode and the cathode) or the open-circuit voltage of the battery.

Reference Signal

The reference signal of the present invention is a wave generated as a combination of waves selected from a rectangular wave, a stepwise wave, a sawtooth wave, a sine wave, direct current, alternating current, and pulsating current and is particularly preferably a wave selected from the rectangular wave, the stepwise wave, the sawtooth wave, and combinations of two or more of these.

Charging Method

The charging method of the present invention for achieving the full performance of the secondary battery is characterized in that the battery is charged by changing the charging current or the charging voltage in the increasing and/or decreasing direction in the range from before arrival at the storage quantity at the inflection point in the potential curve of the electrodes or in the curve of the open-circuit voltage of the battery, at least to the storage quantity at the inflection point and in that the change component of the charging current includes a discharge process part to allow flow of current in the discharge direction. By the above charging method, the battery can be activated more uniformly by gently charging, for example, by charging with gradual increase of the charging current or by charging it a little, thereafter discharging some, and then again charging it (repetition of charge and discharge pattern), thereby effecting gentle molecular structural change due to the electrochemical reaction of the active substances of the electrodes. This can increase the charge and discharge efficiency and extend the charge-charge cycle life.

Operation Method During Charge

The operation method during charge in the steps of the present invention for achieving the full performance of the battery is one characterized in that at least one or more discharge operations are carried out before arrival at the storage quantity at the inflection point and then the charge is conducted up to the full charge state, and it is also characterized in that charging is effected by repeating at least one or more patterns of charge-discharge to achieve activation of the secondary battery.

It is also preferable to interpose a rest component after the charge process part in the aforementioned charge process part-discharge process part pattern, or after the discharge process part, or between the charge process part and the discharge process part. (The above is also true where the charge process part of the charge wave is treated as a charge operation, the discharge process part as a discharge operation, and the rest component as a rest operation.)

The operation method of the present invention is also characterized in that the change of the charging current is change in the increasing direction, the change of the charging current is a stepwise increase, and it is also preferable to interpose a rest component (quiescent operation) during the stepwise increase of the charging current.

FIG. 1 shows a curve of open-circuit voltage V(q) of a battery against storage quantity (q) of the Li secondary battery using tin as an anode-active material and lithium-cobalt oxide ($LiCoO_2$) as a cathode-active material, in which there exist two inflection points (at storage quantities $q_1$, $q_2$) before arrival at full charge (charge quantity 100%). FIGS. 2A through 2D, 3A, 3B, 4A and 4B show typical examples of operation methods during charge, which are characteristics of the present invention, for the battery having the characteristics of FIG. 1.

In FIG. 1, there are the first inflection point at the charge quantity $q_1$ and the second inflection point at the charge quantity $q_2$ before arrival at full charge (Q) in the battery open-circuit voltage curve (a) against storage quantity. The first inflection point and the second inflection point each occur at the battery open-circuit voltage of V1 or V2, respectively.

Figure 2A:
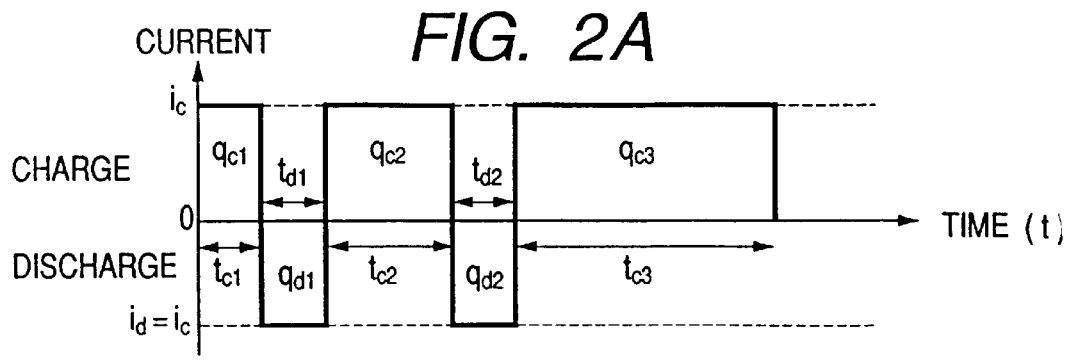
FIGS. 2A, 2B, 2C and 2D are diagrams to show typical examples for explaining operation methods during charging in the activation step which is the feature of the present invention.
Figure 2B:
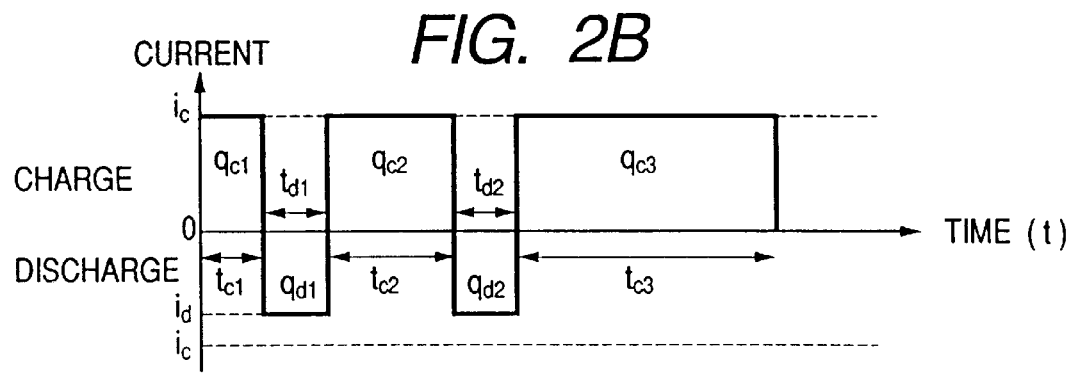
Figure 2C:
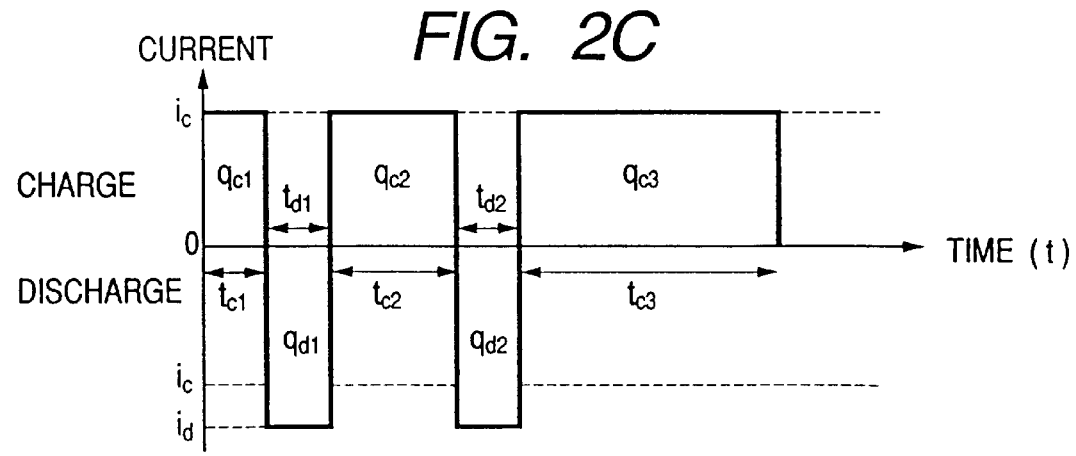
Figure 2D:
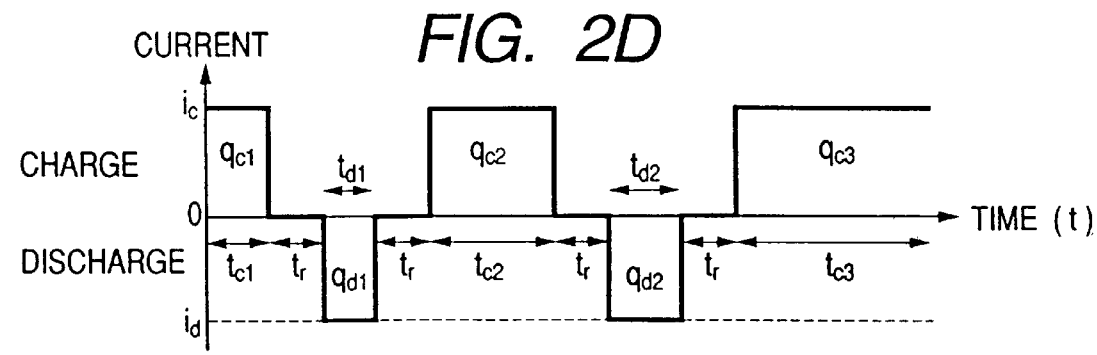

FIGS. 2A to 2D show examples of discharges carried out at the inflection points, in which the battery is charged up to the full charge by operation of charge-discharge-charge-discharge-charge at constant current. Particularly, FIG. 2D is an example in which a quiescent operation is set after each charge and each discharge.

Figure 3A:
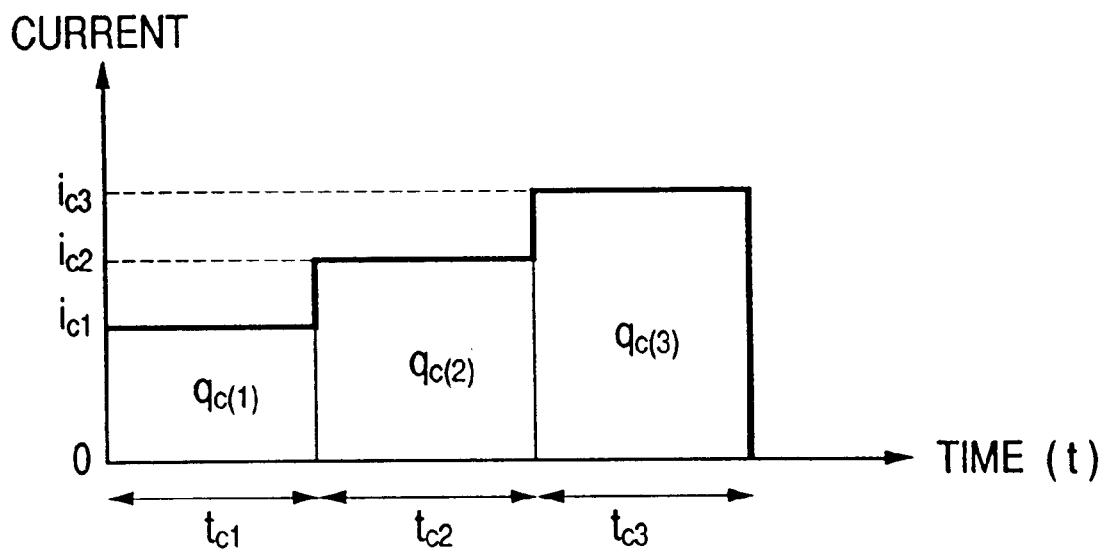
FIGS. 3A and 3B are diagrams to show other examples for explaining operation methods during charging in the activation step which is the feature of the present invention.
Figure 3B:
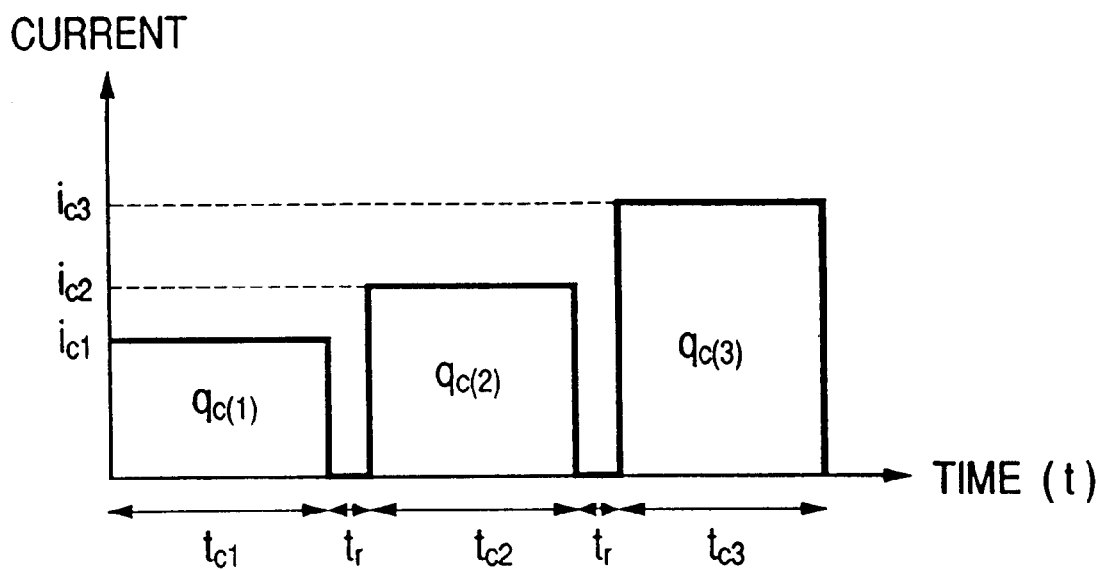

FIGS. 3A and 3B are examples in which charge steps are carried out each at constant current, with charging current increasing stepwise at the inflection points. Particularly, FIG. 3B is a case in which a quiescent operation is placed during a period of each increase of the charging current.

Figure 4A:
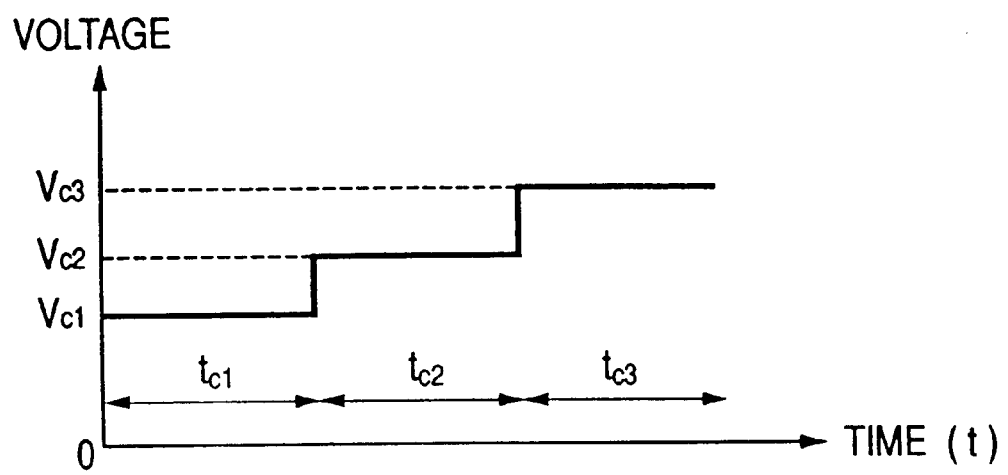
FIGS. 4A and 4B are diagrams to show another example for explaining an operation method during charging in the activation step which is the feature of the present invention.
Figure 4B:
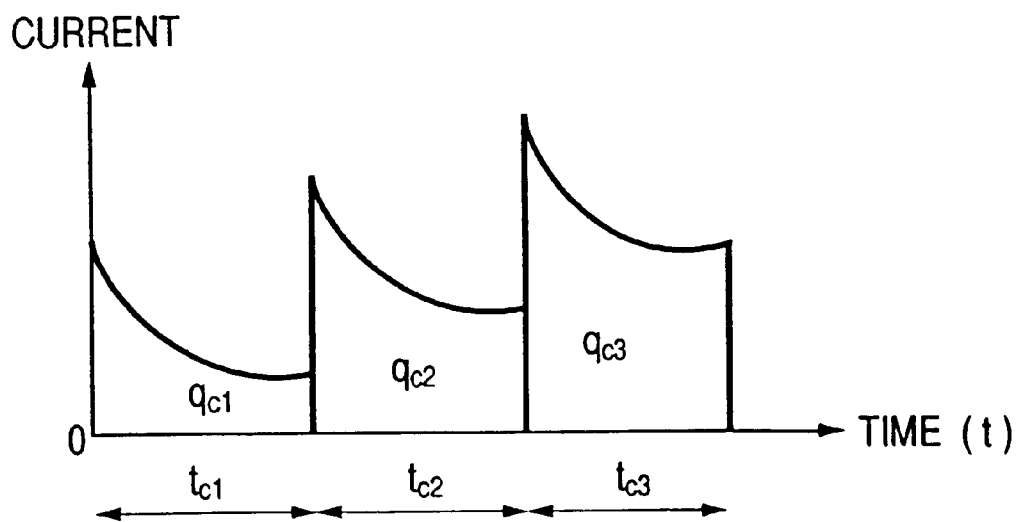

FIGS. 4A and 4B show time changes of the voltage and current, respectively, where the constant charging voltage undergoes stepwise step-up operation at the inflection points. Each of the above operations is a charging method devised so that in the initial cycle of charging, the structure of the electrode-active materials is prevented from changing quickly and the structural change occurs gently.

Discharge Operation Carried Out at Inflection Points of FIG. 1: FIGS. 2A to 2D.

FIGS. 2A to 2D are the examples wherein a charge is made by the charging current $i_c$, (time $t_{c1}$); when the quantity of (the charging current $i_c \times t_{c1}$)=$q_{c1}$ reaches the storage quantity $q_1$ of FIG. 1 ($q_{c1}=q_l$), a discharge is made to a discharge quantity $q_{d1}$ (time $t_{d1}$) by the discharging current $i_d$; then a charge is made to a charge quantity $q_{c2}$ ($q_{c1}-q_{d1}+q_{c2}$=storage quantity $q_2$) (time $t_{c2}$); a discharge is made to a discharge quantity $q_{d2}$ (time $t_{d2}$) by the constant current $i_d$; thereafter a charge is made to the full charge (Q) (time $t_{c3}$)

by the constant current $i_c$. FIG. 2A is the example of $i_c=i_d$, FIG. 2B is the example of $i_c>i_d$, and FIG. 2C is the example of $i_c<i_d$. Further, FIG. 2D is the example in which the rest time ($t_r$) is provided after each charge and after each discharge.

In the present invention, at least one or more of above discharge operations are carried out in the range of $q_{c1}$ (initial charge quantity)$\leq q_1$ (storage quantity at the inflection point of the battery open-circuit voltage), and a plurality of charge-discharge operations may also be carried out in the range. Although we do not intend to specify the conditions of the charge operations and the discharge operations, i.e., the charging current value $i_c$ and the discharging current value $i_d$, or the charge time $t_c$, the discharge time $t_d$, and the rest time $t_r$ in particular, the current values ($i_c$ and $i_d$) are 0.5 C (hour rate 2) or less, preferably those equivalent to 0.02 C (hour rate 50) to 0.5 C (hour rate 2), and particularly, more preferably those equivalent to 0.05 C (hour rate 20) to 0.2 C (hour rate 5) with respect to the battery capacity. The charge operations may also be carried out by charging at a constant voltage.

The discharge quantity to the charge quantity in each cycle ($q_{d1}/q_{c1}$, $q_{d2}/q_{c2}$) is preferably 1 to 99% and more preferably 30 to 70%. In order to avoid overdischarge, it is preferable to set the discharge so as to stop at a preset cut-off voltage.

In the present invention, at any time during charging, {total charge electricity quantity ($\Sigma q_c$)−total discharge electricity quantity ($\Sigma q_d$)} is preferably not over 150% of the battery capacity and more preferably not over 120% of the battery capacity. Namely, it is preferable to avoid overcharge. It is also preferable to prevent the {total charge electricity quantity−total discharge electricity quantity} from being greater than 0, i.e., to avoid overdischarge.

In the present invention, the battery is charged while carrying out at least one or more discharge operations before the inflection point where the structural change of the electrode-active materials is considered to occur, whereby the structural change of the electrode materials occurs gently during the charge, whereby the irreversible capacity (undischargeable capacity) can be reduced in the initial cycle of charge and discharge, and whereby the cycle life can be increased.

Stepwise Increase of Charging Current: FIGS. 3A and 3B

FIGS. 3A and 3B are the examples where the charge is started by the charging current $i_{c1}$; when the charge quantity ($i_{c1} \times t_{c1}=q_{c1}$) reaches the storage quantity $q_1$ of FIG. 1A, the charging current is stepped up to $i_{c2}$ ($i_{c2}>i_{c1}$); and when the charge quantity reaches the storage quantity ($q_{c1}+q_{c2}=q_2$), the charge current is further stepped up to $i_{c3}$ ($i_{c3}>i_{c2}$) to charge the battery to the full charge (Q).

The example (g) is the case in which a rest time ($t_r$) is provided before each step-up.

In the present invention, the operation method is characterized by carrying out at least one or more increase operations of the charging current described above in the range of $q_{c1} \leq q_1$, and the charging current may also be increased in a plurality of steps or in a continuous manner.

The current value at the start of charge ($i_{c1}$) is preferably that equivalent to 0.02 C (hour rate 50) to 0.5 C (hour rate 2) and more preferably that equivalent to 0.05 C (hour rate 20) to 0.2 C (hour rate 5) with respect to the battery capacity.

In the above charging operation of the present invention, the current density can be set to a low value in the initial stage of charging, whereby the electrochemical reaction takes place gently and whereby the structural change of the electrode-active materials caused thereby also occurs gently; therefore, the irreversible capacity can be reduced in the initial cycle of charge and discharge and the cycle life can be increased.

Stepwise Increase of Charging Voltage: FIGS. 4A and 4B

FIGS. 4A and 4B show constant-voltage charging where the charge is started by the charging voltage value $V_{c1}$; when the charge quantity $q_{c1}$ reaches the storage quantity $q_1$ of FIG. 1A ($q_{c1}=q_1$), the applied voltage is stepped up to $V_{c2}$ ($V_{c2}>V_{c1}$); when the charge quantity reaches the storage quantity ($q_2=q_{c1}+q_{c2}$), the applied voltage is stepped up to $V_{c3}$ ($V_{c3}>V_{c2}$) to charge the battery to the full charge (Q).

The stepped-up voltages are preferably set with consideration to a charge cell voltage as a result of the addition of an open-circuit voltage at the inflection point and an overvoltage during the charge and with consideration to the cut-off voltage (V cut off) of the upper limit where no decomposition occurs of the electrolyte solution. Preferably $V_{c1}=V_1+\eta_1$ ($V_1$: the open-circuit voltage at the inflection point 1, $\eta_1$: the overvoltage in charge), $V_{c2}=V_2+\eta_2$ ($V_2$: the open-circuit voltage at the inflection point 2, $\eta_2$: the overvoltage in charge), and $V_{c3}=$V cut off.

In the present invention, the operation method is also characterized in that at least one or more increase operations of the charging voltage are carried out, and the increase operation may also be carried out in a plurality of steps or in a continuous manner. A rest time may also be provided before each stepwise increase.

It was verified that the above operation of the present invention was also able to reduce the irreversible capacity in the initial cycle of charge and discharge and increase the cycle life.

When the above operations of FIGS. 2A through 2D, 3A, 3B, 4A and 4B were compared with the case of charging to the full charge with a constant current as to the discharge quantity by the discharge operation after the full charge, it was verified that each of the operations in FIGS. 2A–2D, 3A, 3B, 4A and 4B demonstrated the effects of increasing the discharge quantity and reducing the irreversible capacity.

Figure 5:
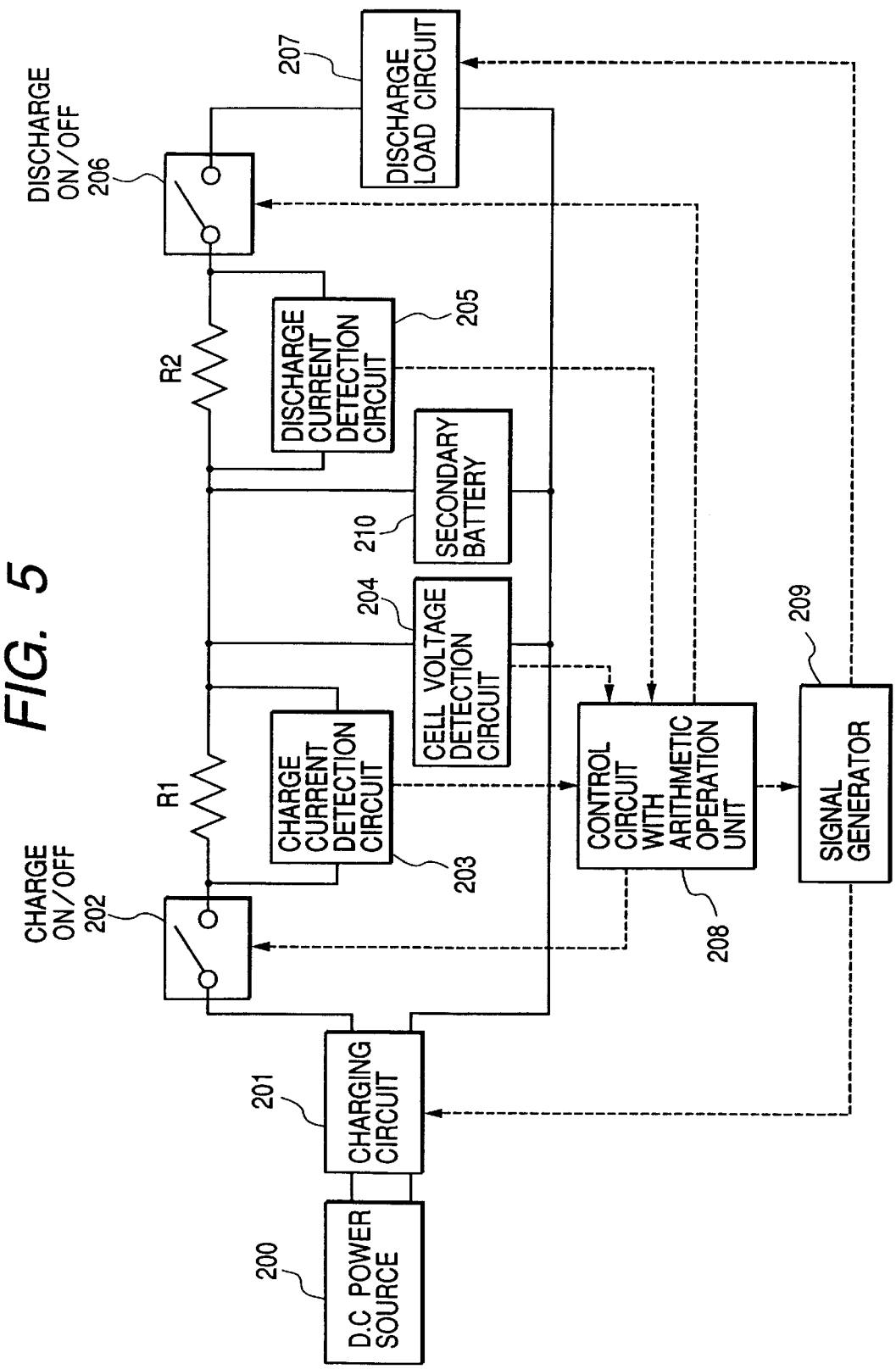
FIG. 5 is a diagram to show an example of the structure of a charging circuit used in the operation during charging in the activation step of the Li secondary battery according to the present invention.

Device for Carrying Out Initial Activation or Charge Operation of the Secondary Battery An example of the device for carrying out the initial activation or charge operation of the secondary battery according to the present invention is shown in FIG. 5. Basically, the device is composed of a DC power source (200), a charge circuit (201), a charge on/off switching circuit (202), a charge current detection circuit (203) for detecting the charge current of the battery, a cell voltage detection circuit (204) for detecting the voltage of the secondary battery, a discharge current detection circuit (205) for detecting the discharging current of the battery, a discharge load current (207) for carrying out the discharge operation, a discharge on/off switching circuit (206), a secondary battery (210), a signal wave generation circuit (209) for changing the charging current or, the charging voltage and charging current, and a control circuit (208) with an arithmetic operation circuit.

The charging circuit (201) is a circuit for charging the secondary battery (210) at constant current or at constant voltage. The discharge load circuit (207) is a circuit for discharging the secondary battery and controlling the discharging current.

The control circuit (208) with the arithmetic operation unit computes the storage quantity and the open-circuit voltage of the secondary battery from a current value and a voltage value detected from the charge current detection circuit (203) or the discharge current detection circuit (205) and from the cell voltage detection circuit (204) and sends a signal to the charge on/off switching circuit (202), or to the discharge on/off switching circuit (206), or to the signal generator (209), thereby carrying out the change of the charge current value or the charging voltage value, or the switching operation of charge and discharge, or the quiescent operation.

A method for controlling the charge based on the computation of the open-circuit voltage from the current value and cell voltage is, for example, as follows: since the inflection points in the activation method of the present invention are determined by the battery materials as described above, the arithmetic operation circuit is preliminarily provided with input of the relation between the cell voltage and the cell open-circuit voltage (or the cell voltage during charge/discharge) against the current values during charge or discharge of the secondary battery (210); the circuit is adapted to compute the cell open-circuit voltage from the current value and voltage value detected from the charge current detection circuit (203) or the discharge current detection circuit (205) and from the cell voltage detection circuit (204); when the voltage reaches the open-circuit voltage (or storage quantity) of the battery at the inflection point preliminarily inputted, the circuit sends a signal to the signal generator (209), or to the charge on/off switching circuit (202), or to the discharge on/off switching circuit (206) to carry out the change of the charge current or the charging voltage, or the switching operation of charge and discharge, or the quiescent operation.

An alternative method is a method for computing the storage quantity from a value of current x time. Namely, the storage quantity is computed by subtracting the total discharge quantity (the current value detected by the discharge current detection circuit x discharge time) from the total charge quantity (the current value detected by the charge current detection circuit x charge time), and when the value reaches the storage quantity at the inflection point, the control circuit activates the signal generator (209), the charge on/off switching circuit (202), or the discharge on/off switching circuit (206) and controls the charging under the following conditions. The charge on/off switching circuit (202) is a circuit for switching the charge on or off and is subjected to on/off control in response to the signal from the control circuit (208) with the arithmetic operation unit.

The discharge on/off switching circuit (206) is a circuit for switching the discharge on or off and is subjected to on/off control in response to the signal from the control circuit (208) with the arithmetic operation unit.

The signal generator (209) is a circuit for changing the signal wave of the charging current or the charging voltage and is adapted to change the signal wave according to the aforementioned pulse wave, stepwise wave, sawtooth wave, or sine wave. The signal generator (209) is controlled by the signal from the control circuit (208) with the arithmetic operation unit.

The charge current detection circuit (203) and the discharge current detection circuit (205) detect the voltage at both ends of a current detection resistor (R1 or R2) connected in series to the secondary battery to detect the charging current value and the discharging current value of the battery. The charge current detection circuit (203) and the discharge current detection circuit (205) supply the detected current values to the control circuit (208) including the arithmetic operation unit.

The cell voltage detection circuit (204) detects the open-circuit voltage, the charging voltage, or the discharging voltage of the secondary battery (210) to supply the voltage to the control circuit (208) with the arithmetic operation unit.

Secondary Battery

Figure 6:
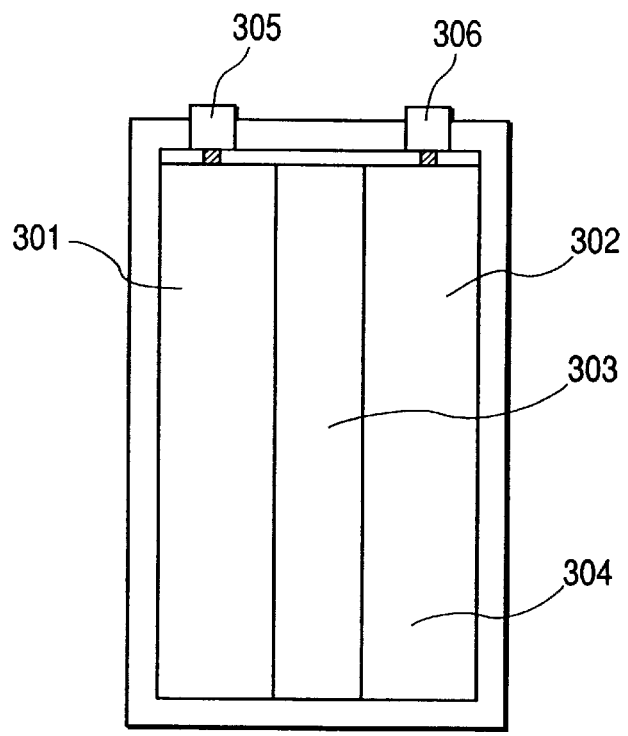
FIG. 6 is a schematic diagram to show a cross-section of a secondary battery of the present invention.

The secondary battery making use of the oxidation-reduction reaction of Li ions adaptable to the charging method in the present invention is basically composed of an anode 301, a cathode 302, a separator and electrolyte (electrolyte solution) 303, a battery jar (cell housing) 304, an anode terminal 305, and a cathode terminal 306, as illustrated in FIG. 6.

Anode

The anode 301 of the secondary battery used in the charging method of the present invention is basically comprised of a current collector, and an anode material capable of absorbing and desorbing Li ions.

The principal material of the anode is selected from metals, lithium alloys, metal oxides, metal nitrides, carbon materials, silicon, or composite materials thereof. Particularly, it is more effective to use a material having multi-step (multi-phase) intercalation potentials of Li as a principal material of the anode. Specific examples include tin, indium, bismuth, zinc, lead, cadmium, alloys containing these, composite materials of these, and so on.

It is also necessary to add an electroconduction assist material, a binding agent, and the like as the occasion may demand. The electroconduction assist material can be powder (spheres, flakes, scales, etc.) or fiber of aluminum, nickel, titanium, stainless steel, graphite, or amorphous carbon such as carbon black, Ketjen black, acetylene black, or the like.

The binder is preferably one stable in the electrolyte solution, and specific examples of the binder are fluororesins and polyolefins such as polytetrafluoroethylene, polyvinylidene fluoride, polyethylene, polypropylene, ethylene-propylene copolymer, ethylene-propylene-diene terpolymer, cellulose, and so on.

The current collector has the role of efficiently supplying the current consumed in the electrode reaction during the charge/discharge, or the role of collecting the current generated. Therefore, a desirable material is one having high conductivity and being inactive to the cell reaction. Specific examples of such materials include nickel, titanium, copper, aluminum, stainless steel, platinum, palladium, gold, zinc, various alloys, and composite metals of two or more of the foregoing materials. The shape of the current collector can be selected from the shapes of sheet, foil, mesh, sponge, fiber, punching metal, expanded metal, and so on.

Cathode

The cathode is comprised of a current collector, a cathode-active material, an electroconduction assist material, a binder, and so on, and is produced by mixing the cathode-active material, the electroconduction assist agent, the binder, etc. and molding the mixture on the current collector.

The cathode-active material is normally selected from oxides and sulfides of transition metals containing lithium. The transition metal elements in the transition metal oxides and the transition metal sulfides are elements having the d-shell or the f-shell in part, which are, for example, Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. Mainly used elements are metals in the first transition element series, Ti, V, Cr, Mn, Fe, Co, Ni, and Cu.

Particularly, Mn and Ni compounds are examples experiencing change of crystal structure and having the inflection point at intercalation or deintercalation of Li.

The electroconduction assist material used for the cathode can be powder (spheres, flakes, scales, etc.) or fiber of aluminum, nickel, titanium, stainless steel, graphite, or amorphous carbon such as carbon black, Ketjen black, acetylene black, or the like.

The binder is preferably one stable in the electrolyte solution, and specific examples of the binder are fluororesins and polyolefins such as polytetrafluoroethylene, polyvinylidene fluoride, polyethylene, polypropylene, ethylene-propylene copolymer, ethylene-propylene-diene terpolymer, cellulose, and so on.

The current collector has the role of efficiently supplying the current consumed in the electrode reaction during the charge/discharge, or the role of collecting the current generated. Therefore, a desirable material is one having high conductivity and being inactive to the cell reaction. Specific examples of such materials include nickel, titanium, copper, aluminum, stainless steel, platinum, palladium, gold, zinc, various alloys, and composite metals of two or more of the foregoing materials. The shape of the current collector can be selected from the shapes of sheet, foil, mesh, sponge, fiber, punching metal, expanded metal, and so on.

Separator

The separator functions to prevent a short-circuit between the anode and the cathode. It also functions to retain the electrolyte solution. Since the separator needs to have micropores through which Li ions can move and needs to be insoluble and stable in the electrolyte solution, the material used is selected from materials of nonwoven fabric or micropore structure of glass, polyolefins such as polypropylene, polyethylene, etc., fluororesins, polyamides, and so on. It is also possible to use a metal oxide film or a composite resin film with a metal oxide having micropores. Particularly, when the metal oxide film having the multilayer structure is used, it has the effect of preventing short-circuit because of its resistance to penetration of dendrites. The safety can be further enhanced where the material used is a flame retardant fluororesin film, or a non-combustible glass or metal oxide film.

Electrolyte

The electrolyte may be used as it is, in the form of a solution in which the electrolyte is dissolved in a solvent, or in the fixed form obtained by adding a gelling agent of polymer or the like into the solution. It is common practice to use the electrolyte in the form in which the electrolyte solution of the electrolyte dissolved in the solvent is retained in the porous separator. The conductivity of the electrolyte is preferably as high as possible; the conductivity at 25° C. is desirably at least $1\times10^{-3}$ S/cm or more and more preferably $5\times10^{-3}$ S/cm or more.

The electrolyte is selected from acids such as $H_2SO_4$, HCl, $HNO_3$, etc., salts of lithium ions ($Li^+$) and Lewis acid ions ($BF_4^-$, $PF_6^-$, $ClO_4^-$, $CF_3SO_3^-$, $BPh_4^-$ (Ph: phenyl group)), and mixed salts of these. In addition to the above-stated electrolytes, the electrolyte can also be selected from salts of cations such as sodium ions, potassium ions, tetraalkylammonium ions, or the like, and Lewis acid ions. The above salts are preferably subjected to sufficient dehydration and deoxygenation, for example, by heating them under reduced pressure.

The solvent for the electrolyte can be selected from acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolane, sulfolane, nitromethane, dimethyl sulfide, dimethyl sulfoxide, dimethoxy ethane, methyl formate, 3-methyl-2-oxazolidinone, 2-methyltetrahydrofuran, 3-propyl sydnone, sulfur dioxide, phosphoryl chloride, thionyl chloride, sulfuryl chloride, and mixtures thereof.

It is preferable that the above solvent should undergo dehydration by activated alumina, molecular sieve, phosphorus pentoxide, calcium chloride, or the like and that some of the solvents undergo removal of impurity and dehydration by distillation under coexistence of alkaline metal in an inert gas. In order to avoid leakage of the electrolyte solution, it is preferably gelatinized. It is desirable to use a polymer absorbing the solvent of the electrolyte solution to swell, as the gelling agent, which is, for example, a polymer of polyethylene oxide, polyvinyl alcohol, polyacrylamide, or the like.

Structure and Production Method of Secondary Battery

The shapes of the secondary battery effective for the present invention include, for example, a flat shape, a cylindrical shape, a rectangular parallelepiped shape, a sheet shape, and so on. Further, the structures of the battery include, for example, a single layer type, a multiple layer type, a spiral type, and so on.

Figure 7:
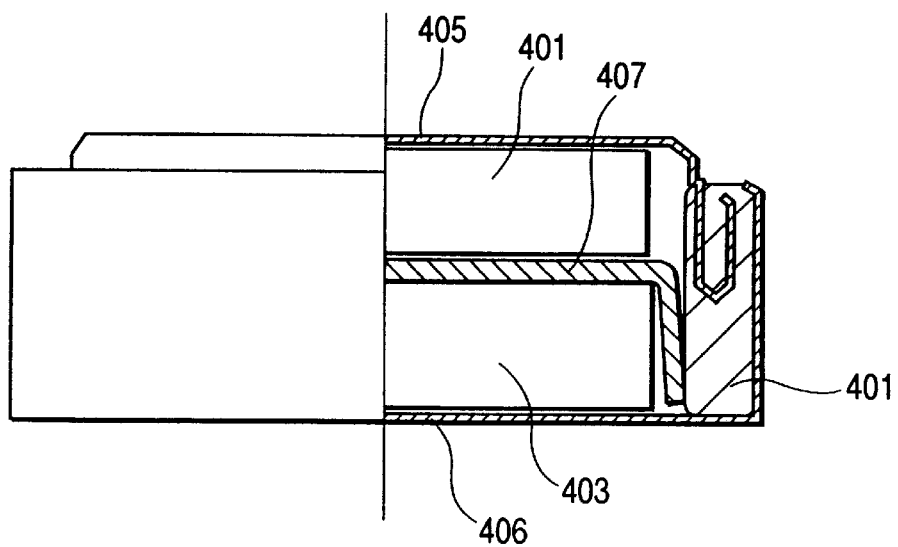
FIG. 7 is an example of a schematic, sectional view of a single-layer flat battery.

The shape and structure of the battery will be described below referring to FIG. 7, FIG. 8, and FIG. 9. FIG. 7 is a sectional view of a single layer type flat (coin-shaped) battery, FIG. 8 a sectional view of a spiral type cylindrical battery, and FIG. 9 a sectional view of the structure of a rectangular parallelepiped battery. These Li batteries are constructed basically in similar structure to FIG. 6 and have the anode, the cathode, the electrolyte-separator, the battery housing, and the output terminals.

In FIG. 7, FIG. 8, and FIG. 9, 401, 503, or 601 designates the anode, 403, 506, or 603 the cathode, 405, 508, or 605 the anode terminal (anode cap or anode can), 406, 509, or 606 the cathode terminal (cathode can or cathode cap), 407, 507, or 607 the separator-electrolyte solution, 410 or 510 a gasket, 501 or 600 the anode collector, 504 the cathode collector, 511 an insulator sheet, 512 an anode lead, 513 a cathode lead, 514 or 614 a safety valve, and 609 the battery housing (battery jar).

In the flat (coin-shaped) secondary battery illustrated in FIG. 7, the cathode 403 including a cathode material layer and the anode 401 1having an anode material layer are stacked at least through the separator 407 retaining the electrolyte solution. This lamination is accommodated from the cathode side into the cathode can 406 as a cathode terminal, and the anode side is covered by the anode cap 405 as an anode terminal. The gasket 410 is placed in the other portion in the cathode can.

Figure 8:
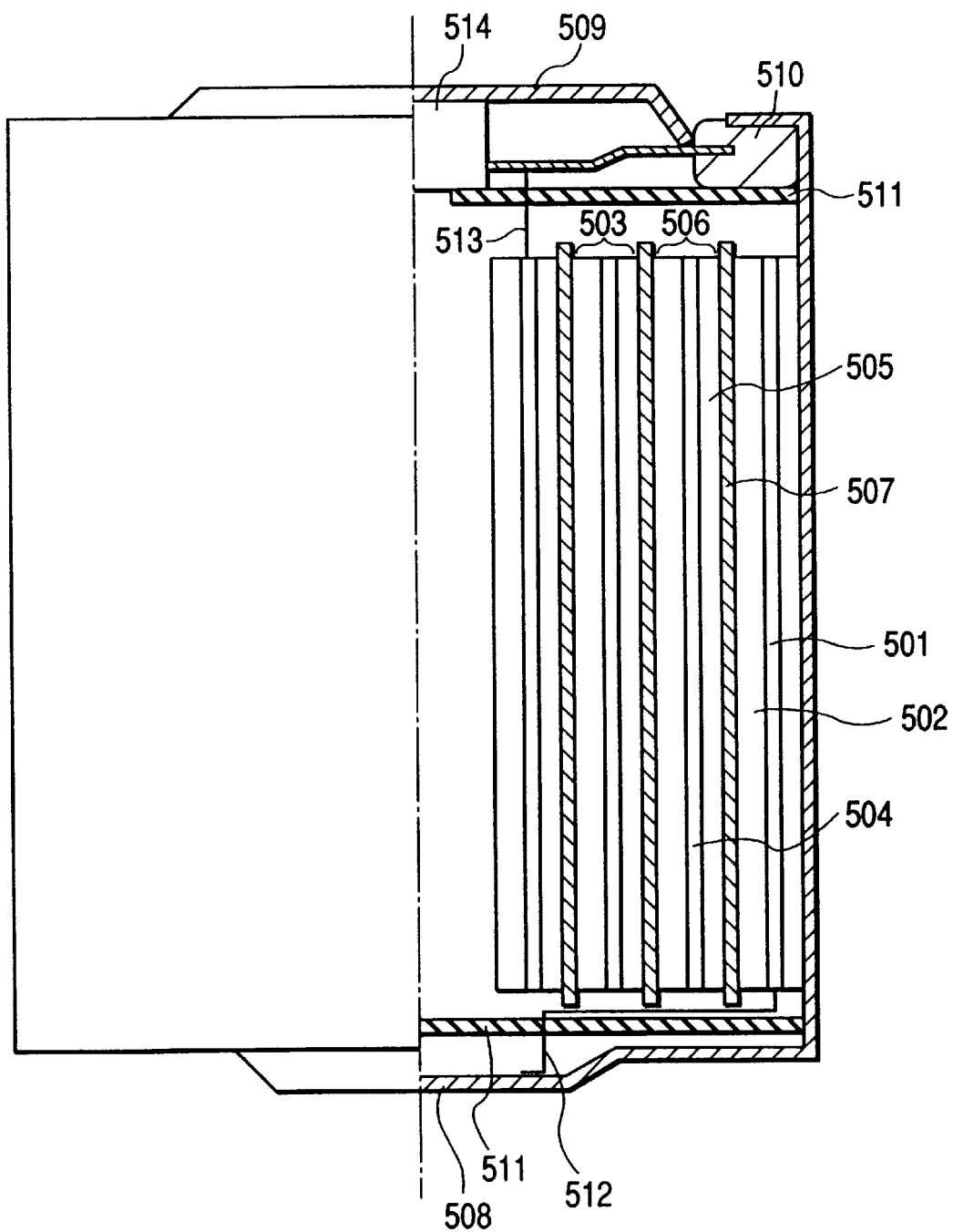
FIG. 8 is an example of a schematic, sectional diagram of a spiral-structure cylindrical battery.

In the spiral type cylindrical secondary battery illustrated in FIG. 8, the cathode having the cathode (material) layer 505 formed on the cathode collector 504 and the anode 503 having the anode (material) layer 502 formed on the anode collector 501 are opposed to each other at least through the separator 507 retaining the electrolyte solution to form a lamination of the cylindrical structure rolled multiply. This lamination of the cylindrical structure is accommodated in the anode can 508, as an anode terminal. The cathode cap 509 as a cathode terminal is provided on the aperture side of the anode can 508, and the gasket 510 is placed in the other portion in the anode can. The lamination of the electrodes in the cylindrical structure is isolated from the cathode cap through the insulator sheet 511. The cathode 506 is connected via the cathode lead 513 to the cathode cap 509. The anode 503 is connected via the anode lead 512 to the anode can 508. The safety valve 514 for regulating the internal pressure inside the battery is provided on the cathode cap side.

An example of how to assemble the batteries illustrated in FIG. 7 and FIG. 8 will be described below.

(1) The separator (407, 507) is interposed between the anode layer (401, 502) and the molded cathode-active material layer (403, 505), and they are put into the battery can (406, 508).

(2) The electrolyte is poured into the can, and thereafter the battery can cap (405, 509) and the gasket (410, 510) are assembled.

(3) The above assembly (2) is caulked, thereby completing the battery.

It is desirable to carry out the above-stated material preparation of the lithium battery, and the assembly of the battery in sufficiently dehydrated dry air or in dry inert gas.

Figure 9:
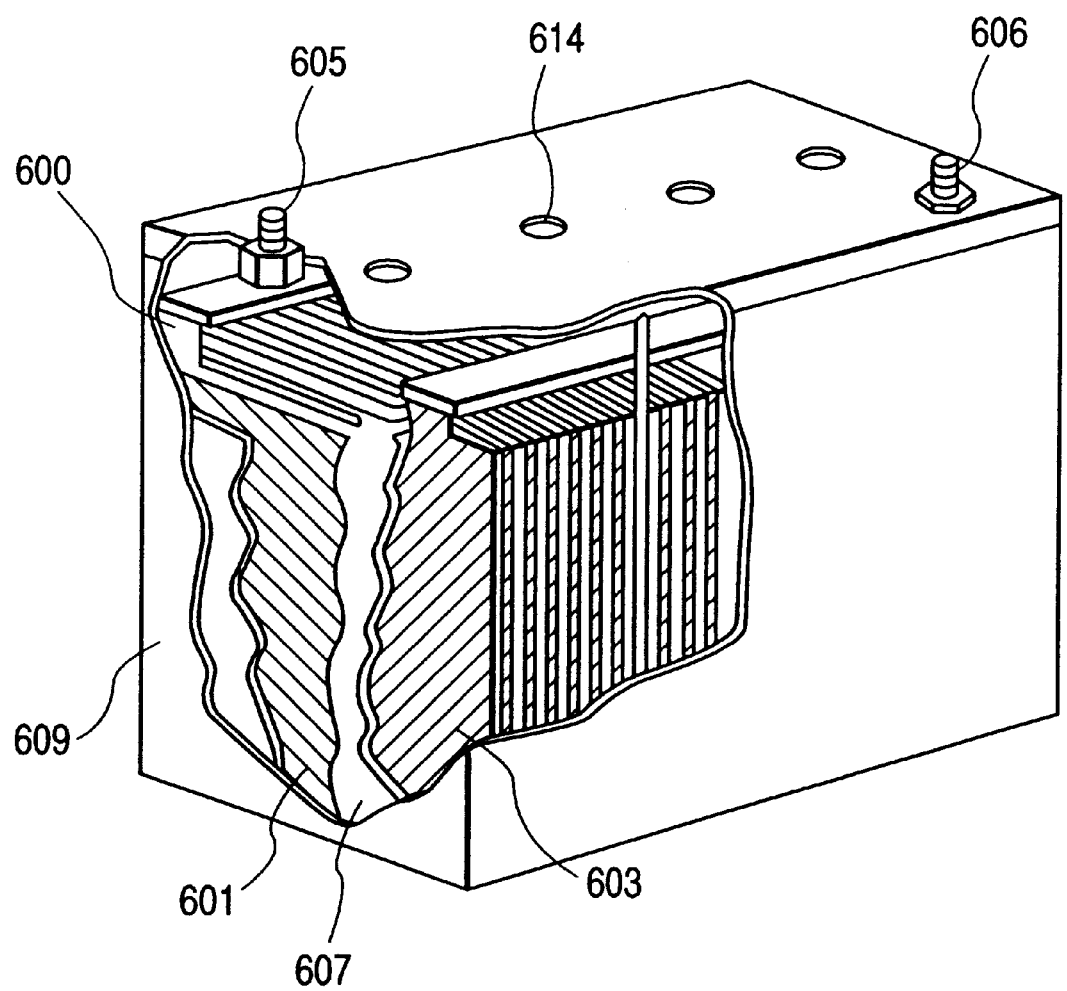
FIG. 9 is an example of a schematic, structural diagram of a rectangular battery.

In the example of the rectangular parallelepiped battery of FIG. 9, unit cells each in the structure of anode 601/separator 607 containing the electrolyte solution/cathode 603 are stacked through the separator, and these are accommodated in the battery case 609 (battery jar). The anodes 601 are connected to the anode terminal 605 and the cathodes 603 to the cathode terminal 606. The secondary battery is provided with the safety valve 614 as described hereinafter.

An example of how to assemble the battery illustrated in FIG. 9 will be described below.

(1) The anode (601), separator (607), and cathode (603) are stacked through the separator and connected in parallel via the current collectors. Thereafter, they are assembled into the battery jar (609).

(2) After connection of the anode terminal (605) and the cathode terminal (606), the electrolyte is poured into the jar.

(3) The lid is put on the battery jar (609) so as to close it, thereby completing the battery.

The members in the examples of the above secondary batteries will be described in detail.

Gasket

Materials for the gasket (410, 510) are, for example, fluororesin, polyamide, polysulfone, and a variety of rubbers. Sealing methods of the batteries, applicable in addition to the "caulking" with the gasket as illustrated in FIG. 7 and FIG. 8, include the methods of glass sealing, adhesive, welding, soldering, and so on.

Materials for the insulator sheet of FIG. 8 are, for example, various plastic materials and ceramics.

Housing Battery Case

The battery housing accommodating the members of the secondary batteries in the present invention also serves, for example, as the electrode terminals of the battery and as the cathode can and anode cap or as the anode can and cathode cap, as in the examples illustrated in FIG. 7 and FIG. 8. In the example illustrated in FIG. 7, the cathode can 406 and anode cap 405 compose the battery housing also serving as the output and input terminals, and in the example illustrated in FIG. 8, the anode can 508 and cathode cap 509 compose the battery housing also serving as the output and input terminals. A preferred material for the battery housing also serving as the output and input terminals is stainless steel. Particularly, materials often used are titanium clad stainless steel sheets, copper clad stainless steel sheets, nickel-plated steel sheets, and so on.

On the other hand, when the cathode output/input terminal and the anode output/input terminal are provided separately from the battery housing, as in the example illustrated in FIG. 9, materials for the battery housing can be, for example, metals such as zinc or the like, plastics such as polypropylene or the like, or composites of plastics with metal or glass fiber, as well as stainless steel.

Safety Valve

The secondary battery of the present invention is preferably provided with the safety valve (514 in the example of FIG. 8 or 614 in the example of FIG. 9) as a safety measure in the event of an increase in the internal pressure of the battery. Examples of the safety valve are rubber, a spring, a metal ball, bursting foil, and so on.

EXAMPLES

The present invention will be described in more detail, based on its examples. It is noted that the present invention is by no means intended to be limited to these examples.

First, the secondary batteries used in evaluation of the activation method of the present invention will be described.

Production of Secondary Battery

In the present invention, AA-size Li secondary batteries were produced in the cross-sectional structure illustrated in FIG. 8. For the evaluation in the present invention, the anode used was the tin anode or the graphite anode.

The following describes the production procedures of each component of the battery and the assembly of the battery with reference to FIG. 8.

(1) Production procedures of the anode Production procedures of the tin anode:

(i) A tin plate as an anode was placed above a copper foil 18 $\mu$m thick (501 as an anode collector) in the electrolyte solution of tin sulfate. A DC voltage was placed in the anode current density of 10 mA/cm$^2$ between the anode and the cathode with agitation of the electrolyte solution at the liquid temperature of 25° C. up to 20 C/cm$^2$, to deposit a layer of metallic tin (502 as an anode layer) on the copper foil. The tin layer on the copper foil was washed with water and thereafter dried at 150° C. under reduced pressure, thereby forming the anode.

(ii) The anode thus produced was cut into the predetermined size, and the lead 512 of a nickel wire was connected to the electrode by spot welding, thereby obtaining the anode 503.

Production Procedures of the Graphite Anode:

(i) A paste was made by blending powder of the graphite structure (MCMB: Mesocarbon Microbeads) and polyvinylidene fluoride 10 wt % as a binder and kneading them with N-methyl-2-pyrrolidone. The paste was then applied onto the copper foil 18 $\mu$m thick (501 as an anode collector) with a coater and then dried to form a carbon layer (502 as an anode layer) in the thickness of 80 $\mu$m. The carbon layer was dried at 150° C. under reduced pressure, thereby obtaining the anode.

(ii) The anode thus produced was cut into the predetermined size, and the lead 512 of the nickel wire was connected to the above electrode by spot welding to obtain the anode 503.

(2) Production Procedures of Cathode 606

Production Procedures of Lithium-cobalt Oxide:

(i) Cobalt carbonate and lithium carbonate were blended in the ratio of Li:Co=1:1 (atomic ratio), and thereafter the mixture was thermally treated at 850° C., thereby preparing the lithium-cobalt oxide.

(ii) The lithium-cobalt oxide 85 wt % thus prepared in above (i) was blended with carbon powder of acetylene black 5 wt % and polyvinylidene fluoride powder 10 wt %, and thereafter N-methyl-2-pyrrolidone was added thereinto.

(iii) The paste obtained in above (ii) was applied onto aluminum foil 20 $\mu$m thick (cathode collector 504) and then dried. Thereafter it was pressed by roll press and dried at 150° C. under reduced pressure, thereby preparing the cathode having the cathode-active material layer in the thickness of 90 $\mu$m.

(iv) Then the cathode obtained was cut into the predetermined size, and the lead 513 of an aluminum wire was connected to the above collector by spot welding to obtain the cathode 506.

(3) Production Procedures of Electrolyte Solution 507
  (i) Equal amounts of ethylene carbonate (EC) and dimethyl carbonate (DMC) dehydrated well were mixed to prepare a solvent.
  (ii) 1 M (mol/1) lithium tetrafluoroborate was dissolved in the solvent obtained in above (i), thereby obtaining the electrolyte solution.
(4) Separator 507
  (i) A polyethylene micropore separator was used.
(5) Assembly of Battery
  All the assembly steps were carried out under a dry atmosphere in which water was controlled at the dew point of not more than −50° C.
  (i) The separator 507 was interposed between the anode 503 and the cathode 506, the lamination was rolled in the spiral form to obtain the structure of separator/cathode/separator/anode/separator, and then the roll was put into the anode can 508 of titanium clad stainless steel.
  (ii) Then the anode lead 512 was connected to the bottom of the anode can 508 by spot welding. A neck was formed in the upper part of the anode can by a necking device, and the cathode lead 513 was welded to the cathode cap 509 provided with the gasket 510 of polypropylene by a spot welder.
  (iii) Then the electrolyte solution was poured into the can. Thereafter the cathode cap was placed on the can, and the cathode cap and anode can were caulked by a caulking machine to close the can, thereby producing the battery. The batteries produced were samples for measuring the open-circuit voltage against storage quantity and samples for checking the effect of the initial charging method.

The batteries were cathode-capacity-regulated batteries in which the capacity of the anode was greater than that of the cathode.

Ascertaining Inflection Point

First, the batteries thus produced were subjected to charge and discharge to measure the open-circuit voltage and the discharge quantity of the batteries in various storage states and obtain a curve of the relationship of open-circuit voltage against storage quantity. The inflection points were determined using the curve.

Figure 10:
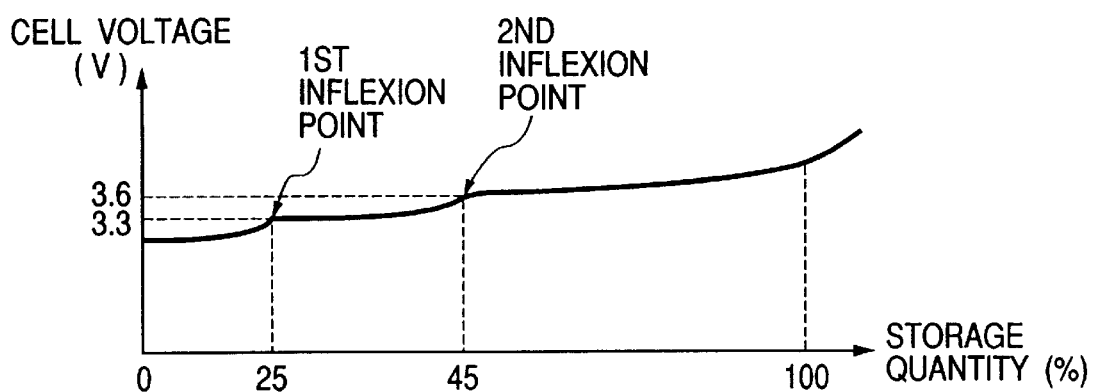
FIG. 10 is a diagram to show the relationship between storage quantity and cell voltage in constant-current charge when a tin anode is used.

Further, it was verified that a curve was obtained of the relationship between charge quantity and cell voltage when the charge-discharge Coulomb efficiency became maximum by the charge at a constant current equivalent to 0.1 C (hour rate 10) with respect to the reference where the electric capacity computed from the cathode-active material amount was the storage quantity 100% and that charge quantities at inflection points appearing in this curve agreed approximately with the storage quantities at the inflection points of the open-circuit voltage curve obtained previously. FIG. 10 shows the relationship of the cell voltage to the storage quantity in 0.1 C charge of the Li secondary battery with the tin anode where the first inflection point exists at the storage quantity 25% (cell voltage 3.3 V) and the second inflection point exists at the storage quantity 45% (cell voltage 3.6 V).

The inflection points were obtained from change of signs of the second derivative (second order differential) $d^2V/dQ^2$ (Q: storage quantity) of the curve, i.e., the open-circuit voltage or the cell voltage V.

Figure 11:
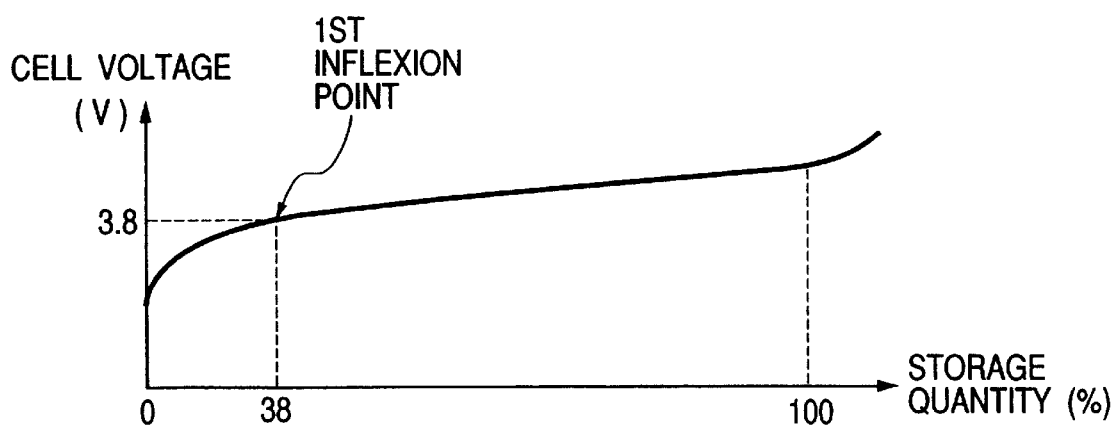
FIG. 11 is a diagram to show the relationship between storage quantity and cell voltage in constant-current charge when a MCMB (Mesocarbon Microbeads) anode is used.

As in the case of the tin anode, FIG. 11 shows the relationship between storage quantity and cell voltage in the constant-current charge in the case of the MCMB anode being used. The storage quantity 38% (voltage 3.8 V) was determined as a first inflection point.

In secondary batteries with the tin anode produced according to the above method (which were other secondary battery after assembly, different from those used in obtaining the inflection points as described above), the initial charge was conducted under the following operation conditions of Embodiments 1 to 4 and Comparative Example 1, using the voltage curve and the data of inflection points described above.

Embodiment 1

Figure 12:
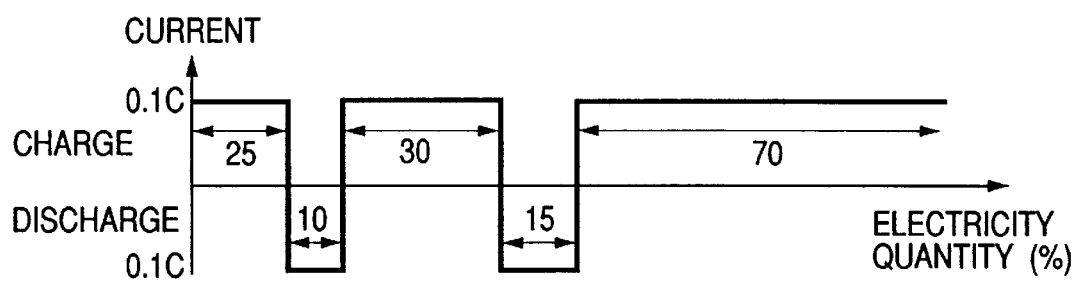
FIG. 12 is a diagram to show an operation during charging in Embodiment 1, which shows an example where the discharge operation is carried out at inflection points.

Embodiment 1 is an example in which the discharge operation was carried out once at each of the inflection points. The operation during the charge is illustrated in FIG. 12.

The secondary battery using the tin anode produced according to the above method was charged by the current equivalent to 0.1 C (hour rate 10), to the storage quantity 25%, then the electricity quantity of 10% was discharged by the current equivalent to 0.1 C, thereafter the charge was carried out to the electricity quantity 30% (storage quantity 45%), the discharge of electricity quantity 15% was then carried out, and thereafter the battery was charged to full charge.

Embodiment 2

Figure 13:
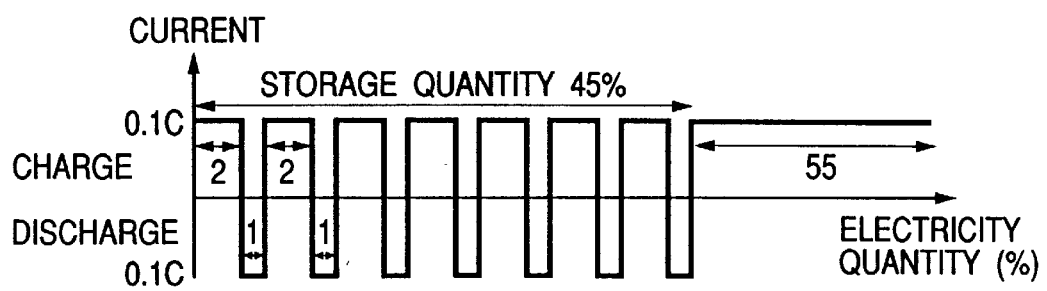
FIG. 13 is a diagram to show an operation during charging in Embodiment 2, which shows an example where the battery is charged up to a storage quantity at an inflection point by carrying out charge and discharge alternately.

Embodiment 2 is an example in which the battery was charged by alternately carrying out charges and discharges to the storage quantity at the inflection point. The operation during the charge is illustrated in FIG. 13.

The battery was charged up to the storage quantity 45% by repeatedly carrying out charge (electricity quantity 2%) and discharge (electricity quantity 1%) operations by the current equivalent to 0.1 C, and thereafter was charged to full charge.

Embodiment 3

Figure 14:
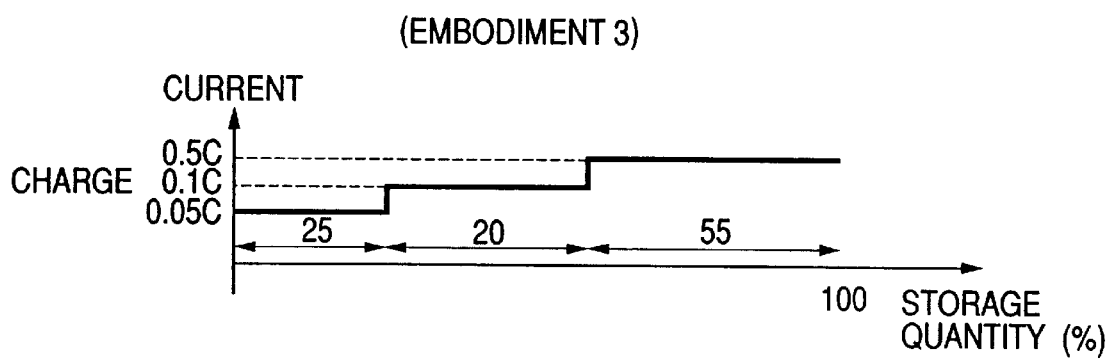
FIG. 14 is a diagram to show an operation during charging in Embodiment 3, which shows an example where the charging current is increased stepwise at each inflection point.

Embodiment 3 is an example in which the charging current was increased stepwise at each of the inflection points. The operation during the charge is illustrated in FIG. 14.

The battery was charged up to the electricity quantity 25% (storage quantity 25%) by the current equivalent to 0.05 C; thereafter, the current was increased to one equivalent to 0.1 C, and the battery was charged to the electricity quantity 20% (storage quantity 45%) by the current of 0.1 C; the current was further increased to one equivalent to 0.5 C, and then the battery was charged to the full charge by the current of 0.5 C.

Embodiment 4

Figure 15:
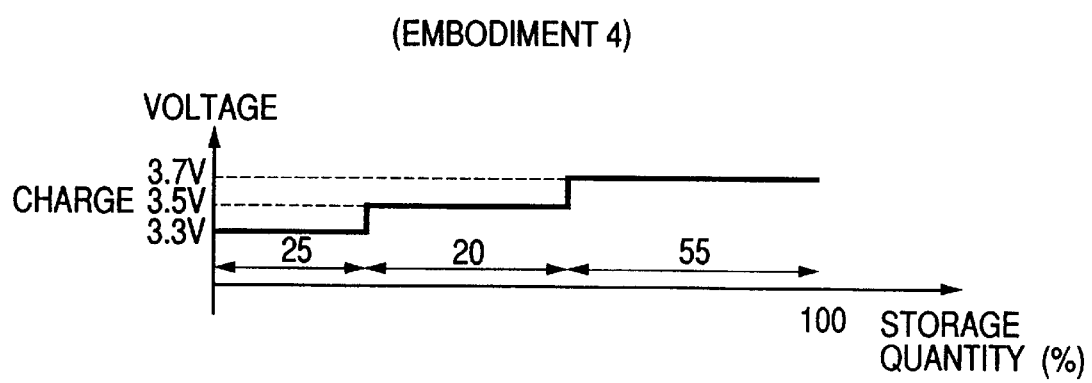
FIG. 15 is a diagram to show an operation during charging in Embodiment 4, which shows an example where the charging voltage is increased stepwise at each inflection point.

Embodiment 4 is an example in which the charging voltage was increased stepwise at each of the inflection points. The operation during the charge is illustrated in FIG. 15.

The battery was charged to the electricity quantity 25% (storage quantity 25%) by the constant voltage of 3.3 V; thereafter the charging voltage was increased to 3.5 V, and the battery was charged to the electricity quantity 20% (storage quantity 45%) by the voltage of 3.5 V; the charging voltage was further increased to 3.7 V, and then the battery was charged to full charge by the voltage of 3.7 V.

Comparative Example 1

Figure 16:
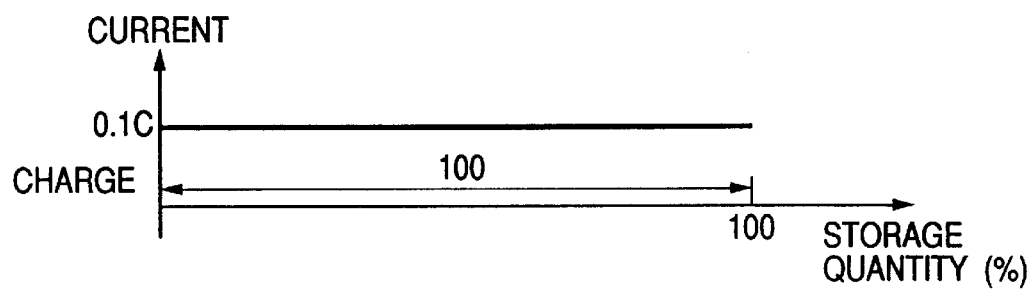
FIG. 16 is a diagram to show an operation during charging in Comparative Example 1, which shows an example where the battery is charged up to full charge by a constant current.

The battery was charged to the full charge by the charging current kept at the constant current equivalent to 0.1 C. The operation during the charge is illustrated in FIG. 16.

With the secondary batteries using the MCMB anode produced in the above method, the initial charge was conducted under the following operation conditions of Embodiments 5 to 7 and Comparative Example 2.

Embodiment 5

Figure 17:
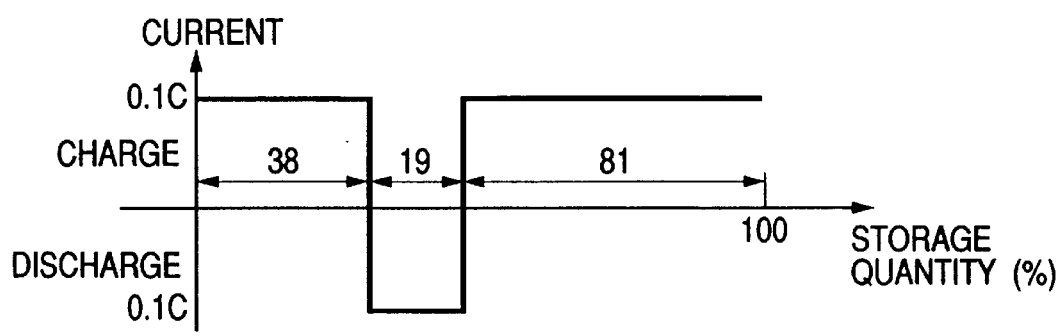
FIG. 17 is a diagram to show an operation during charging in Embodiment 5, which shows an example where the discharge operation is carried out at an inflection point.

Embodiment 5 is an example in which the discharge operation was carried out once at the inflection point. The operation during the charge is illustrated in FIG. 17.

The secondary battery using the MCMB anode produced according to the above method w as charged by the current equivalent to 0.1 C to the storage quantity 38%, then the electricity quantity of 19% was discharged by the current equivalent to 0.1 C, and thereafter the battery was charged to full charge.

Embodiment 6

Figure 18:
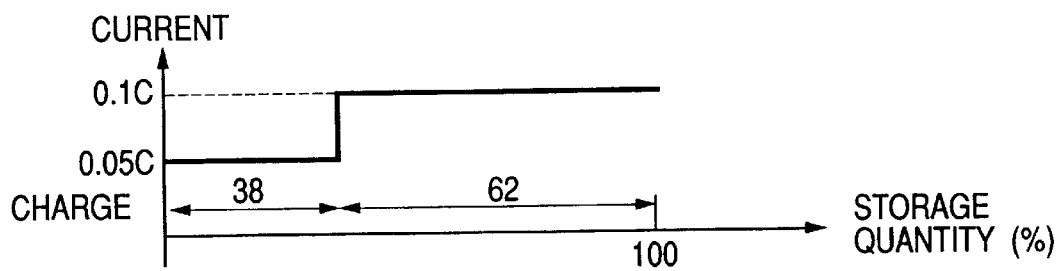
FIG. 18 is a diagram to show an operation during charging in Embodiment 6, which shows an example where the charging current is increased at an inflection point.

Embodiment 6 is an example in which the charging current was increased at the inflection point. The operation during the charge is illustrated in FIG. 18.

The battery was charged to the electricity quantity 38% (storage quantity 38%) by the current equivalent to 0.05 C, thereafter the current was increased to one equivalent to 0.1 C, and then the battery was charged to full charge.

Embodiment 7

Figure 19:
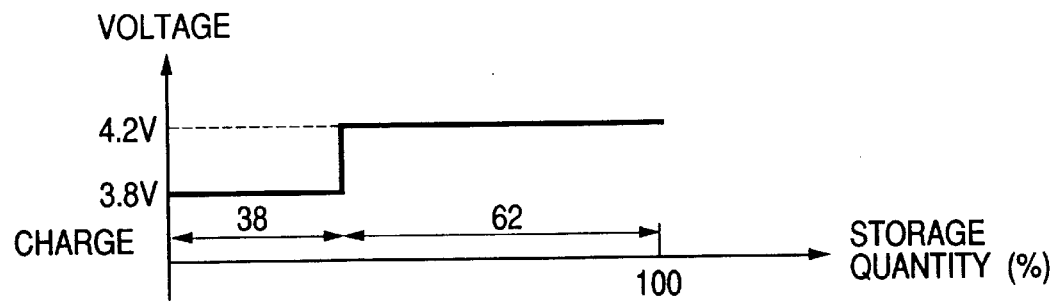
FIG. 19 is a diagram to show an operation during charging in Embodiment 7, which shows an example where the charging voltage is increased at an inflection point.

Embodiment 7 is an example in which the charging voltage was increased at the inflection point. The operation during the charge is illustrated in FIG. 19. The battery was charged to the electricity quantity 38% (storage quantity 38%) by the constant voltage of 3.8 V, thereafter the charging voltage was increased to 4.2 V, and then the battery was charged to full charge by the voltage of 4.2 V.

Comparative Example 2

Figure 20:
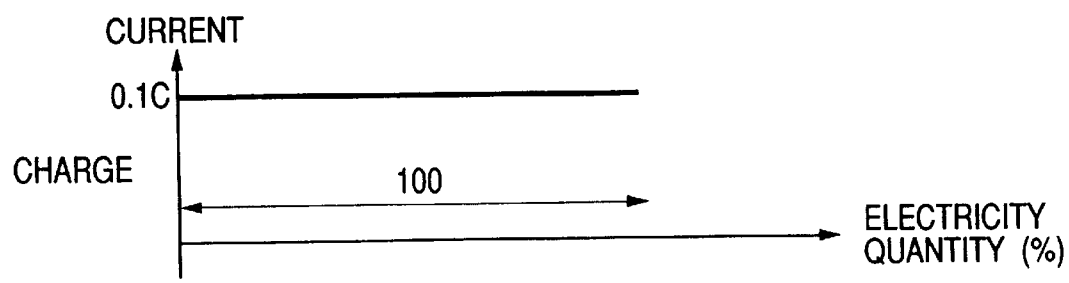
FIG. 20 is a diagram to show an operation during charging in Comparative Example 2, which shows an example where the battery is charged up to full charge by a constant current.

The battery was charged to full charge by the charging current kept at the constant current equivalent to 0.1 C. The operation during the charge is illustrated in FIG. 20.

Initial Charge-Discharge Cycle Test Conditions

The batteries having undergone the initial charge after the battery assembly under the above conditions of Embodiments 1 to 7 and Comparative Examples 1 and 2 were subjected to cycles of charge and discharge by the current equivalent to 0.1 C and rest time of 20 minutes.

The cut-off voltage of discharge was set to 2.8 V in the case of the tin anode and to 2.5 V in the case of the MCMB anode. The tests were started from discharge.

The irreversible capacity during the initial charge-discharge cycles was defined as a cumulative amount of irreversible capacities in repetition of charge and discharge up to the discharge quantity of 100% under the above conditions.

The charge-discharge cycle life was determined by tests under the following conditions after the above charge-discharge cycles.

Charge-Discharge Cycle Test Conditions

The conditions of the charge-discharge cycle tests were as follows: one cycle was defined as a cycle of charge and discharge by the current equivalent to 0.5 C (the current of hour rate 2) with respect to the reference of the electric capacity computed from the cathode-active material amount, and the rest time of 20 minutes. The cycle life was defined as the number of cycles at first occurrence of below 60% of the battery capacity. The cut-off voltage of charge was set to 4.5 V, and the cut-off voltage of discharge was set to 2.8 V in the case of the tin anode and to 2.5 V in the case of the MCMB anode.

Table 1 shows the results of the irreversible capacity and the charge-discharge cycle life of the secondary batteries using the tin anode where the initial charge was carried out according to the methods of Embodiments 1 to 4. The values of the irreversible capacities and lives in the charge-discharge initial cycles in Table 1 are values normalized with respect to Comparative Example 1.

Table 2 shows the results of the irreversible capacity and the charge-discharge cycle life of the secondary batteries using the MCMB anode where the initial charge was carried out according to the methods of Embodiments 5 to 7 and Comparative Example 2. The values of the irreversible capacities and lives of the charge-discharge initial cycles in Table 2 are values normalized with respect to Comparative Example 2.

TABLE 1

|  | Irreversible capacity in initial cycle of charge and discharge | Life |
|---|---|---|
| Embodiment 1/ Comparative Example 1 | 0.67 | 1.25 |
| Embodiment 2/ Comparative Example 1 | 0.66 | 1.24 |
| Embodiment 3/ Comparative Example 1 | 0.78 | 1.18 |
| Embodiment 4/ Comparative Example 1 | 0.79 | 1.17 |

TABLE 2

|  | Irreversible capacity in initial cycle of charge and discharge | Life |
|---|---|---|
| Embodiment 5/ Comparative Example 2 | 0.76 | 1.18 |
| Embodiment 6/ Comparative Example 2 | 0.81 | 1.17 |
| Embodiment 7/ Comparative Example 2 | 0.86 | 1.16 |

It was seen from Table 1 that when the secondary batteries using the tin anode were charged according to the charging operations of Embodiments 1 to 4, the irreversible capacities in the charge-discharge initial cycles were reduced by 21 to 34% and the charge-discharge cycle lives were increased 1.17 to 1.25 times, as compared with those of Comparative Example 1 where the battery was charged at the constant current.

It was also seen from Table 2 that when the secondary batteries using the MCMB anode were subjected to the charging operations of Embodiments 5 to 7, the irreversible capacities in the charge-discharge initial cycles were reduced by 14 to 24% and the charge-discharge cycle lives were increased 1.16 to 1.18 times, as compared with those of Comparative Example 2 where the battery was charged at the constant current.

It was, therefore, verified that the present invention can decrease the irreversible capacity of charge and discharge and increase the charge-discharge cycle life by carrying out the discharging operation at the charge quantity at the inflection point or charging the battery up to the inflection point by alternately carrying out the charging and discharging operations in the initial charge after production of the battery or by increasing the applied current or the applied voltage at the inflection point.

The following are more specific examples of the device for carrying out the initial activation and charging operation of the secondary battery in FIG. 5 described previously.

Device Example 1

Figure 21:
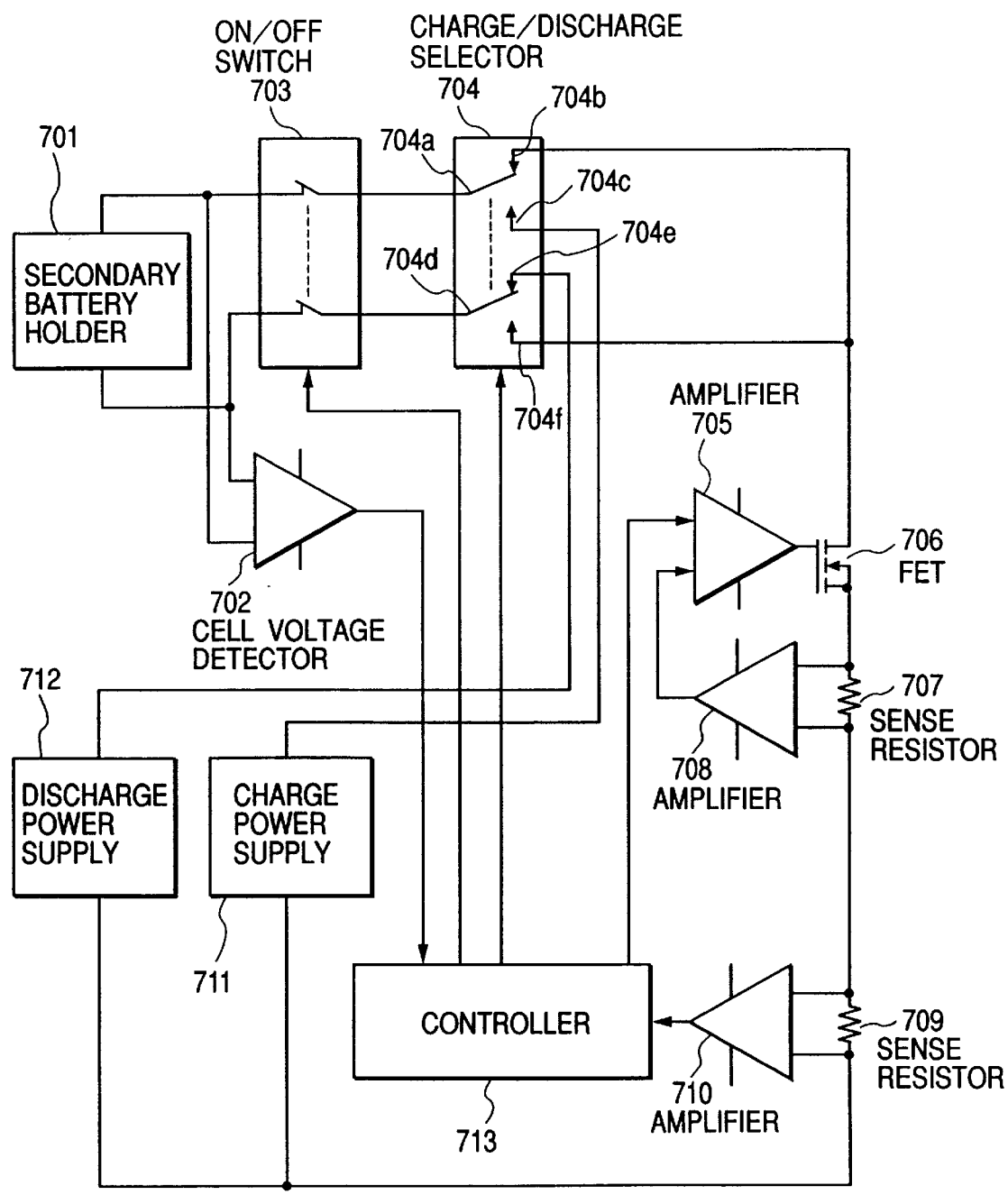
FIG. 21 is a diagram to show an example of the structure of a device used in the initial charge after assembly and before use or in the initial activation for achieving battery performance, or in the charging operation during normal use of the secondary battery or a battery pack according to the present invention.

FIG. 21 shows an example of the structure of the device used in the initial charging after the assembly and before the use of the secondary battery or a battery pack (battery pack structure in which a plurality of secondary batteries are connected in parallel or in series) according to the present invention or in the initial activation for achieving the battery performance, or used in the operation of charging during normal use.

The device is composed basically of a holder (701) for connecting the secondary battery to the present device, a cell voltage detector (702) for detecting the voltage between the terminals of the secondary battery, an ON/OFF switch (703) for switching connection to disconnection between the secondary battery and the charge/discharge unit of the present device and vice versa, a charge/discharge selector (704) for switching charge to discharge of the secondary battery and vice versa, an amplifier 1 (705) for controlling the charging or discharging current of the secondary battery, an FET (706), a sense resistor 1 (707), an amplifier 2 (708), a sense resistor 2 (709) for detecting the charging or discharging current of the secondary battery, an amplifier 3 (710), a charge power supply (711) for charging the secondary battery, a discharge power supply (712) comprised of a load circuit for discharging the secondary battery, and a controller (713) for controlling the current or voltage of charge or discharge.

Here the holder (701) is shaped so as to match the secondary battery or the battery pack as an object on which the present invention is carried out, and it can electrically connect the secondary battery to the present device readily and surely. The cell voltage detector (702) detects the terminal-to-terminal voltage between the cathode and the anode of the secondary battery by high input impedance, and this voltage information is outputted to the controller (713). The ON/OFF switch (703) opens or closes the circuit in response to a command from the controller (713) and is, for example, a two-circuit interlocking contact open/close relay as illustrated in FIG. 21. The charge/discharge selector (704) is a unit for switching the circuit in response to a command from the controller (713) and is, for example, a two-circuit interlocking switch contact relay as illustrated in FIG. 21. The control of the charging or discharging current of the secondary battery is carried out as follows: the amplifier 1 (705) receiving the command from the controller (713) outputs a voltage signal to the FET (706) to determine the circuit current, the actual circuit current value is converted to a voltage signal by the sense resistor 1 (707), the voltage signal is detected by the amplifier 2 (708), the detected signal is fed back to the amplifier 1 (705), and, based thereon, the current is always controlled at a desired value so as to compensate for temperature change and influence of drift of each device. The charging or discharging current of the secondary battery is converted into a voltage signal by the sense resistor 2 (709) to be detected by the amplifier 3 (710), and this voltage information is outputted to the controller (713). It is also possible to make the other part also serving as this current detecting unit in such a manner that the sense resistor 1 (707) converts the detected current to the voltage signal and that the amplifier 2 (708) detects the voltage signal and also outputs it to the controller (713) while feeding it back to the amplifier 1 (705).

The controller (713) can select either connection or disconnection between the secondary battery and the charge/discharge unit of the present device by sending a command to the ON/OFF switch (703). They are connected during the charge or discharge of the secondary battery and disconnected during the rest state of the secondary battery. In cases where the cell voltage does not have to be detected during the rest state of the secondary battery and the battery needs to be separated completely from the circuit, the input of the cell voltage detector (702) is connected between the ON/OFF switch (703) and the charge/discharge selector (704). The controller (713) can select either charge or discharge of the secondary battery by sending a command to the charge/discharge selector (704). In FIG. 21, during discharge, the terminal 704*a* is connected to the terminal 704*b* and the terminal 704*d* to the terminal 704*e*; during charge, the terminal 704*a* is connected to the terminal 704*c* and the terminal 704*d* to the terminal 704*f*. Further, monitoring the cell voltage information from the cell voltage detector (702) and the charging or discharging current value information from the amplifier 3 (710), the controller (713) sends a command to the amplifier 1 (705) for determining the current or voltage of charge or discharge.

Here the controller (713) recognizes the storage quantity of the battery by accumulating the voltage change of the secondary battery and the current and time of charge or discharge and can change the charging current or the charging voltage by the signal wave according to the necessity. This signal wave is a wave of the rectangular shape, the stepwise shape, the sawtooth shape, or a combination of two or more of these.

This signal wave can be output of the data of the signal pattern from a digital-analog converter (hereinafter referred to as DAC) or from a signal generator. Such means may be built into the controller (713), but it does not always have to be built into the controller. It is also conceivable to make the controller incorporating only the DAC and supply the signal pattern data from the outside.

In cases where different signal waves are necessary for respective types of secondary batteries, it is also possible to preliminarily prepare a plurality of signal pattern data or signal generators in the controller (713) and select at least one of them. A way of selection is, for example, to input a select signal from the outside or to provide the device with a communication function with the battery pack and make the controller (713) select one, based on the obtained information.

The above embodiment showed an example in which the device was provided with one control unit, as the device associated with the present invention, but it is also possible that one control unit controls a plurality of devices for carrying out the present invention. The above example was one in which the device had only one battery holder, but it is also possible that the device is provided with a plurality of holders and another circuit changing switch different from the one described above, for example, a multiplexer, and the circuit is switched according to a command from the control unit to apply the invention to the plurality of secondary batteries.

In the above charging device, preferably, the controller 713 is set so as to output a plurality of waves as the signal wave and is provided with a means for selecting at least one wave out of the plurality of waves.

Further, it is also preferable to provide the above charging device with a communication means for communication with the battery pack and with a means for selecting one of plural waves prepared as the currents or voltages of different waveforms, based on information from the battery pack.

Device Example 2

Figure 22:
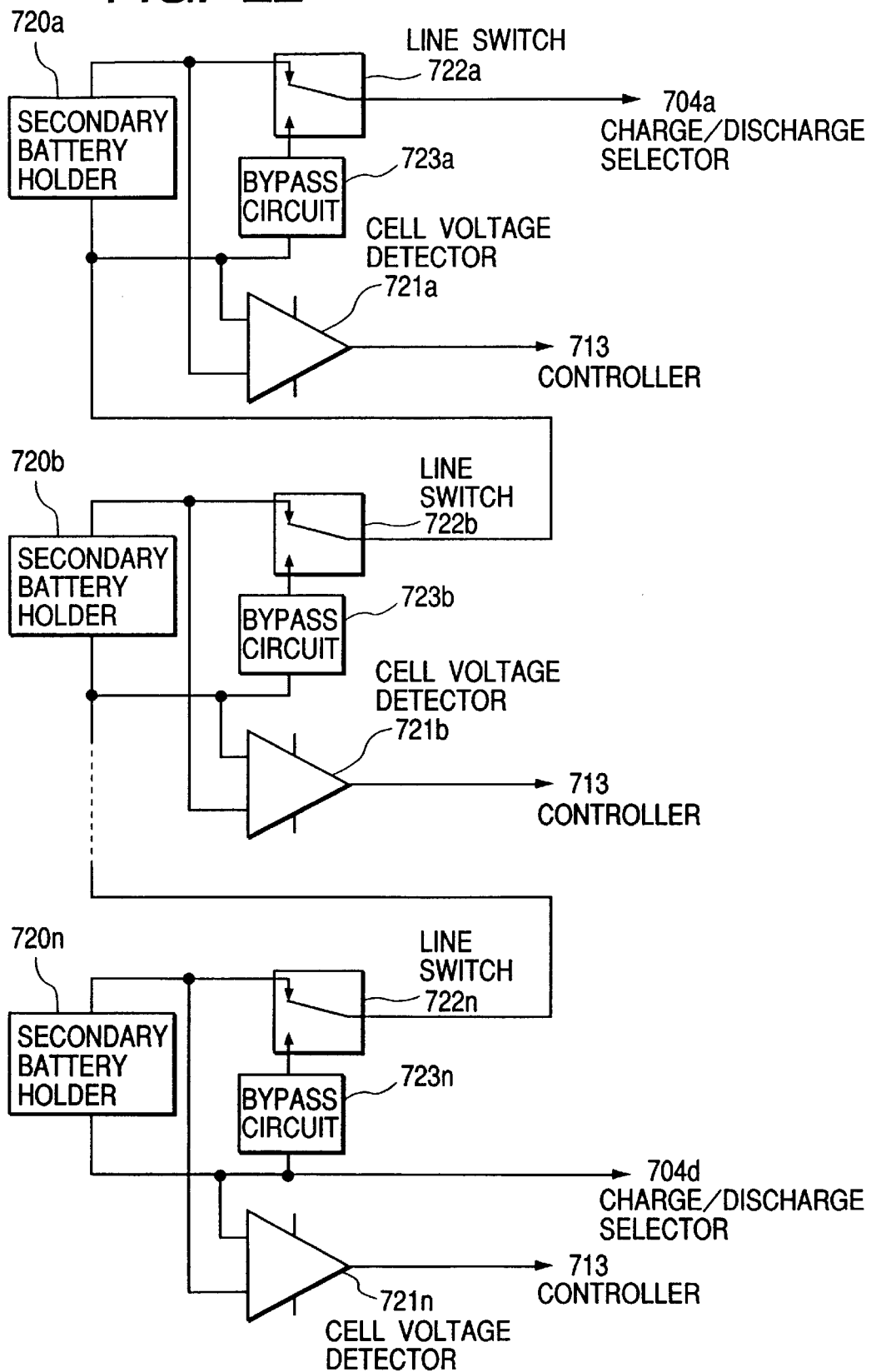
FIG. 22 is a diagram to show an example of the partial structure of a device used in the initial charge after assembly and before use or in the initial activation for achieving battery performance, or in the charging operation during normal use of the secondary battery or the battery pack according to the present invention.

Further, another example of the device associated with the present invention will be described referring to FIG. 22. FIG. 22 shows part of the structure of the device used in the initial charging after the assembly and before the use of the secondary battery or the battery pack according to the present invention or in the initial activation for achieving the battery performance, or used in the operation of charging during normal use. The device is composed basically of n battery holders (720a to 720n), n cell voltage detectors (721a to 721n), n bypass circuits (723a to 723n), a charge/discharge selector (704) for switching charge to discharge of the secondary battery and vice versa, similar to that in FIG. 21, though not illustrated, an amplifier 1 (705) for controlling the charging or discharging current of the secondary battery, an FET (706), a sense resistor 1 (707), an amplifier 2 (708), a sense resistor 2 (709) for detecting the charging or discharging current of the secondary battery, an amplifier 3 (710), a charge power supply (711) for charging the secondary battery, a discharge power supply (712) comprised of a load circuit for discharging the secondary battery, and a controller (713) for controlling the current or voltage of charge or discharge.

In the present example, the n-holders (720a to 720n) for connecting the secondary batteries to the present device are connected in series, the cell voltage detectors (721a to 721n) detect the corresponding terminal-to-terminal voltage between the anode and cathode of the secondary battery each by high input impedance, and this voltage information is outputted to the controller (713). The line switches (722a to 722n) switch the circuit in response to a command from the controller (713) and are, for example, 1-circuit 2-contact switch relays as illustrated in FIG. 22. FIG. 22 also shows shunt resistors having resistance approximately equal to that of the secondary batteries, as the bypass circuits (723a to 723n).

Monitoring each cell voltage information from the cell voltage detector (721a to 721n) and the charging or discharging current value information from the amplifier 3 (710), the controller (713) sends a command to the amplifier 1 (705) for determining the current or voltage of charge or discharge and changes the charging current or the charging voltage by the signal wave as the occasion may demand, which is similar to that described above.

In this example, the times to make the change effective by the signal wave, i.e., storage quantities of the respective batteries, are not always equal among all the batteries. With provision of the structure of the present embodiment, it becomes possible to successively switch to the side of the bypass circuit units (723a to 723n) the line switches (722a to 722n) of the batteries reaching the state suitable for the change of the charging current or the charging voltage by the signal wave, return all the line switches (722a to 722n) to the battery side when all the batteries reach the optimum state, and then change the current or voltage by the signal wave.

As described above, the present invention reduces the irreversible capacity in the initial charge and discharge and increases the charge-discharge cycle life by the charging method of the secondary battery or the device therefor.

What is claimed is:

1. A charging method for a secondary battery comprising an anode, a cathode, and an electrolyte and having an inflection point in a storage region before full charge in a potential curve of the anode, a potential curve of the cathode or an open-circuit voltage curve of the battery against storage quantity, wherein the battery is charged while at least one of a charging current and a charging voltage is subjected to variation with time, at least until the inflection point and, after the inflection point, a charging pattern selected from the group consisting of a charging voltage and a current waveform is changed.

2. The charging method for the secondary battery according to claim 1, wherein said variation is at least one of an increase and a decrease.

3. The charging method for the secondary battery according to claim 2, wherein a waveform of said variation is selected from the group consisting of a rectangular wave, a step wave, a sawtooth wave, a sine wave, and a combination of two or more thereof.

4. The charging method for the secondary battery according to any one of claims 1 to 3, wherein said variation includes a discharge process.

5. The charging method for the secondary battery according to any one of claims 1 to 3, wherein said variation includes a rest process in which neither charge nor discharge is carried out.

6. The charging method for the secondary battery according to claim 5, wherein the secondary battery is charged at least at one of a constant current and a constant voltage, after passing over the inflection point.

7. The charging method for the secondary battery according to claim 1, wherein said charging method is used for initial charge and discharge cycles after assembly of the secondary battery.

8. The charging method for the secondary battery according to claim 7, wherein said initial charge and discharge cycles consist of 10 or fewer cycles.

9. The charging method for the secondary battery according to claim 8, wherein said initial charge and discharge cycles consist of 5 or fewer cycles.

10. The charging method for the secondary battery according to claim 1, wherein said inflection point is a point of change caused by molecular structural change of an active material forming the anode or the cathode.

11. The charging method for the secondary battery according to claim 1, wherein said inflection point is a point of change from convex to concave or from concave to convex in a function curve representing a relation of potential of the anode or potential of the cathode or open-circuit voltage of the secondary battery against storage quantity of the secondary battery, or a point at which a slope of said function curve becomes constant.

12. The charging method for the secondary battery according to claim 1, wherein the secondary battery employs an oxidation-reduction reaction of lithium ions.

13. The charging method for the secondary battery according to claim 1, wherein said anode is an electrode structure at least comprised of a current collector and a material capable of absorbing and desorbing lithium ions, which is placed on one surface or on both surfaces of the current collector, said material being selected from the group consisting of a metal, an alloy thereof, a metal oxide, a metal nitride, a carbon material, silicon, and a combination thereof.

14. The charging method for the secondary battery according to claim 13, wherein said metal or the alloy thereof is tin or a tin alloy.

15. The charging method for the secondary battery according to claim 13, wherein said metal or the alloy thereof is lithium or a lithium alloy.

16. The charging method for the secondary battery according to claim 13, wherein said inflection point and the storage quantity corresponding to the inflection point are values preliminarily measured based on a secondary battery sample having the same structure as a secondary battery subjected to a charging process.

17. A charging device for charging a secondary battery, said device comprising:

a connection portion at least capable of electrically being connected to input and output terminals of a cathode and an anode of the secondary battery;

charging means for charging the secondary battery via the connection portion;

variation means for effecting variation with time of at least one of a charging current and a charging voltage of the charging means; and switching means for switching a charge pattern of the charging means before a predetermined charge quantity to that after said charge quantity, wherein said predetermined charge quantity is a charge quantity corresponding to an inflection point in a storage region before full charge in a potential curve of the anode, a potential curve of the cathode or an open-circuit voltage curve of the battery against storage quantity.

18. An activation device for activating a secondary battery after assembly by charge and discharge, said device comprising:

a connection portion at least capable of electrically being connected to input and output terminals of a cathode and an anode of the secondary battery;

charging means for charging the secondary battery via the connection portion;

variation means for effecting variation with time of at least one of a charging current and a charging voltage of the charging means;

switching means for switching a charge pattern of the charging means before a predetermined charge quantity to that after said charge quantity, wherein said predetermined charge quantity is a charge quantity corresponding to an inflection point in a storage region before full charge in a potential curve of the anode, a potential curve of the cathode or an open-circuit voltage curve of the battery against storage quantity;

discharging means for discharging the secondary battery; and second switching means for switching electrical connection or disconnection between the secondary battery and the charging means or the discharging means.

19. The charging device according to claim 17, said device having means for detecting at least one of a current flowing in said secondary battery and a voltage of said secondary battery.

20. The charging device according to claim 17, wherein said variation is at least one of an increase and a decrease.

21. The charging device according to claim 17, wherein a waveform of said variation is selected from the group consisting of a rectangular wave, a step wave, a sawtooth wave, a sine wave, and a combination of two or more thereof.

22. The charging device according to claim 17, wherein said variation includes a discharge process.

23. The charging device according to claim 17, wherein said variation includes a rest process in which the secondary battery is kept in an open state.

24. The charging device according to claim 17, wherein the secondary battery is charged at least at one of a constant current and a constant voltage after passing over said predetermined charge quantity.

25. The activation device according to claim 18, wherein the secondary battery is subjected to repetition of 10 or fewer cycles of charge and discharge to charge the secondary battery after assembly up to a predetermined charge quantity and thereafter discharge the secondary battery down to a predetermined potential or discharge a predetermined electricity quantity.

26. The activation device according to claim 25, wherein the secondary battery is subjected to repetition of 5 or fewer cycles of charge and discharge.

27. The charging device according to claim 17, wherein said secondary battery has a battery pack structure in which one secondary battery or a plurality of secondary batteries connected in parallel or in series are inserted in a package.

28. The charging device according to claim 27, said device comprising means for communication with said battery pack.

* * * * *